United States Patent
Shreevastav et al.

(10) Patent No.: US 11,956,038 B2
(45) Date of Patent: Apr. 9, 2024

(54) DISCRIMINATING BEAMS BASED UPON POSITION QUALITY METRIC FOR UE LOCALIZATION

(71) Applicant: Telefonaktiebolaget LM Ericsson (publ), Stockholm (SE)

(72) Inventors: Ritesh Shreevastav, Upplands Väsby (SE); Deep Shrestha, Linköping (SE); Iana Siomina, Täby (SE); Giuseppe Destino, London (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 17/616,229

(22) PCT Filed: Jun. 24, 2020

(86) PCT No.: PCT/SE2020/050656
§ 371 (c)(1),
(2) Date: Dec. 3, 2021

(87) PCT Pub. No.: WO2021/006796
PCT Pub. Date: Jan. 14, 2021

(65) Prior Publication Data
US 2022/0311488 A1 Sep. 29, 2022

Related U.S. Application Data

(60) Provisional application No. 62/871,896, filed on Jul. 9, 2019.

(51) Int. Cl.
*H04B 7/06* (2006.01)
*G01S 5/10* (2006.01)
(Continued)

(52) U.S. Cl.
CPC .............. *H04B 7/0617* (2013.01); *G01S 5/10* (2013.01); *H04B 7/0408* (2013.01); *H04B 7/0417* (2013.01); *H04W 64/00* (2013.01)

(58) Field of Classification Search
CPC .. H04B 7/0617; H04B 7/0408; H04B 7/0417; G01S 5/10; G01S 5/0236; H04W 64/00
See application file for complete search history.

(56) References Cited

U.S. PATENT DOCUMENTS

| | | | |
|---|---|---|---|
| 2019/0053013 A1* | 2/2019 | Markhovsky | H04L 43/0864 |
| 2019/0150003 A1* | 5/2019 | He | H04B 7/0617 |
| | | | 342/368 |

FOREIGN PATENT DOCUMENTS

WO  2018029663 A1  2/2018

OTHER PUBLICATIONS

"3GPP TS 24.301 V16.1.1", 3rd Generation Partnership Project; Technical Specification Group Core Network and Terminals; Non-Access-Stratum (NAS) protocol for Evolved Packet System (EPS); Stage 3 (Release 16), Jun. 2019, pp. 1-549.
(Continued)

*Primary Examiner* — Fred A Casca
(74) *Attorney, Agent, or Firm* — Murphy, Bilak & Homiller, PLLC

(57) ABSTRACT

Embodiments include methods, performed by a network node in a wireless network, for positioning a user equipment (UE) based on beams transmitted by the wireless network. Such methods include receiving, from the UE, first positioning measurements of first reference signals (RS) transmitted by the wireless network on a first plurality of beams. Such methods include, based on the first positioning measurements and transmission directions of the first plurality of beams, determining a second plurality of beams that differs from the first plurality of beams by at least one beam (e.g., subset, superset, partially overlapping, etc.). Various ways of
(Continued)

obtaining the second plurality of beams are disclosed. Such methods also include obtaining second positioning measurements made by the UE on the second plurality of beams. Other embodiments include complementary methods performed by a UE, as well as network nodes and UEs configured to perform such methods.

23 Claims, 13 Drawing Sheets

(51) Int. Cl.
　　*H04B 7/0408*　　(2017.01)
　　*H04B 7/0417*　　(2017.01)
　　*H04W 64/00*　　(2009.01)

(56) References Cited

OTHER PUBLICATIONS

"3GPP TS 29.172 V15.0.0", 3GPP; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); (Release 15), Jun. 2018, pp. 1-43.
"3GPP TS 36.305 V15.4.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), Jun. 2019, pp. 1-91.
"3GPP TS 36.355 V15.4.0", 3rd Generation Partnership Project; Technical Specification Group Radio Access Network; Evolved Universal Terrestrial Radio Access (E-UTRA); LTE Positioning Protocol (LPP) (Release 15), Jun. 2019, pp. 1-224.
"3GPP TS 36.331 V15.6.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-960.
"Beam Selection for PRS Transmission in FR2", 3GPP TSG-RAN WG2 #107; R2-1910660; Prague, Czech Republic, Aug. 26-30, 2019, pp. 1-5.
"Discussion on UL angle-based solution for NR positioning", 3GPP TSG RAN WG1 #96; R1-1902343; Athens, Greece, Feb. 25-Mar. 1, 2019, pp. 1-4.
"Dynamic PRS configuration for DL-TDOA positioning", 3GPP TSG-RAN WG2 Meeting #106; R2-1907657; Reno, UAA, May 13-17, 2019, pp. 1-3.
"3GPP TS 29.171 V15.2.0", 3GPP; Technical Specification Group Core Network and Terminals; Location Services (LCS); LCS Application Protocol (LCS-AP) between the Mobile Management Entity (MME) and Evolved Serving Mobile Location Centre (E-SMLC); SLS interface (Release 15), Mar. 2019, pp. 1-62.
"3GPP TS 36.455 V15.2.1", 3rd Generation Partnership Project; Technical Specification Group Radio Access Network; Evolved Universal Terrestrial Radio Access (E-UTRA); LTE Positioning Protocol A (LPPa) (Release 15), Jan. 2019, pp. 1-84.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.
Destino, Giuseppe, et al., "A New Position Quality Metric for NR RAT Dependent OTDOA Positioning Method", 16th Workshop on Positioning, Navigation and Communications (WPNC), Oct. 23-24, 2019, pp. 1-5.

* cited by examiner

DISCRIMINATING BEAMS BASED UPON POSITION QUALITY METRIC FOR UE LOCALIZATION

TECHNICAL FIELD

The present invention generally relates to wireless communication networks, and particularly relates to improvements to positioning of user equipment (UE) in wireless networks that utilize beam-based transmissions.

BACKGROUND

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-low latency critical communications (URLCC), side-link device-to-device (D2D), and several other use cases. The present disclosure relates generally to NR, but the following description of previous-generation technology is provided for context since it shares many features with NR.

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Rel-10 supports bandwidths larger than 20 MHz. One important requirement on Rel-10 is to backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, to scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MME/S-GWs 134 and 138 via respective Sha interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE, after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. An exemplary uplink slot can be configured in similar manner as discussed above, but comprising $N^{UL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as the numerology, μ.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above. Other RS-like DL signals include Primary Synchronization Sequence (PSS) and Secondary Synchronization Sequence (SSS), which facilitate the UEs time and frequency synchronization and acquisition of system parameters (e.g., via PBCH).

Fifth-generation NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE that has some properties similar to a "suspended" condition for LTE.

In addition to providing coverage via cells, as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

3GPP standards provide various ways for positioning (e.g., determining the position of, locating, and/or determining the location of) UEs operating in LTE networks. In general, an LTE positioning node (referred to as "E-SMLC" or "location server") configures the target device (e.g., UE), an eNB, or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device (e.g., UE), the measuring node, and/or the E-SMLC to determine the location of the target device. UE positioning is also expected to be an important feature for NR networks.

To support increased traffic capacity and to enable the transmission bandwidth needed to support very high data rate services, 5G will extend the range of frequencies used for mobile communication. This includes new spectrum below 6 GHz (referred to as "FR1"), as well as spectrum in higher frequency bands above 24 GHz (referred to as "FR2"). High frequency bands (generally referred to as "millimeter wave" or "mmW") provide contiguous larger bandwidth for higher rates in data communication. In such high frequency bands, however, the radio links are susceptible to rapid channel variations and suffer from severe pathloss and atmospheric absorption. To address these challenges, NR base stations and UEs will use often highly directional antennas for beamforming to achieve sufficient link budget in a wide area network.

To facilitate UE-based positioning using UE measurements of signals transmitted by NR base stations, the network needs to provide various assistance data to the UE. This includes, at a minimum, a list of beams/cells to be used for positioning measurements; coordinates of the antenna transmission points (TPs) that provide the respective beams/cells; and the real time difference (RTD) between corresponding transmissions of the respective beams/cells. Since NR uses narrow, high-gain beams in mmW bands to compensate for high path loss, the list of possible beams for UE measurements can grow quite large. This can create various issues, problems, and/or difficulties in relation to the network providing the assistance data to the UEs.

SUMMARY

Embodiments of the present disclosure provide specific improvements to positioning of user equipment (UEs) based on signals transmitted by a wireless network, such as by providing, enabling, and/or facilitating solutions to overcome exemplary problems summarized above and described in more detail below Some embodiments include methods (e.g., procedures) for positioning a user equipment (UE) based on beams transmitted by a wireless network. These exemplary methods can be implemented in a network node (e.g., eNB, gNB, E-SMLC, LMF, etc. or a component thereof).

These exemplary methods can include receiving, from a UE, first positioning measurements of first reference signals (RS) transmitted by the wireless network on a first plurality of beams. The first plurality of beams can include one or more beams originating from a transmission reception point (TRP) associated with the network node, and one or more beams originating from TRPs associated with other network nodes.

These exemplary methods can also include, based on the first positioning measurements and transmission directions of the first plurality of beams, determining a second plurality of beams that differs from the first plurality of beams by at least one beam (e.g., subset, superset, partially overlapping, etc.). These exemplary methods can also include obtaining second positioning measurements made by the UE on the second plurality of beams.

In some embodiments, these exemplary methods can also include transmitting information identifying the first plurality of beams. The information can be transmitted as broadcast system information (SI) or unicast to the UE in response to a request from the UE for a list of preferred beams. In some embodiments where the information identifying the first plurality of beams is transmitted as broadcast SI, these exemplary methods can also include determining an updated first plurality of beams based on the first positioning measurements by the UE, the second positioning measurements by the UE, and/or positioning measurements by other UEs on any of the first plurality of beams; and transmitting information identifying the updated first plurality of beams as broadcast SI or unicast to the UE in response to a request, from the UE, for a list of preferred beams.

In some embodiments, obtaining the second positioning measurements can include sending, to the UE, information identifying the second plurality of beams; transmitting second RS on the second plurality of beams; and receiving, from the UE, the second positioning measurements made by the UE on the second RS.

In some embodiments, the second RS can be positioning reference signals (PRS) and the first RS can be one of the following: PRS, synchronization signal/PBCH blocks (SSBs), or channel state information reference signals (CSI-RS). In some embodiments, the first positioning measurements comprise signal-to-noise ratio (SNR) measurements and the second positioning measurements comprise reference signal time difference (RSTD) measurements. In some embodiments, these exemplary methods can also include determining a UE position based on RSTD measurements comprising the second positioning measurements.

In some embodiments, determining the second plurality can include selecting, as the second plurality, a predetermined number of the first plurality that maximizes a position quality metric computed from SNR measurements of the first positioning measurements and from the transmission directions of the first plurality. In some embodiments, determining the second plurality can be based on a position quality metric that distinguishes between line-of-sight (LOS) and non-LOS propagation conditions associated with respective individual beams of the first plurality.

Other embodiments include methods (e.g., procedures) for performing positioning measurements based on beams transmitted by a wireless network. These exemplary methods can be implemented by a user equipment (UE, e.g., wireless device, IoT device, etc. or component thereof).

These exemplary methods can include performing first positioning measurements on positioning reference signals (PRS) transmitted by the wireless network on a first plurality of beams. In some embodiments, the first plurality of beams can include one or more beams originating from a transmission reception point (TRP) associated with the network node, and one or more beams originating from TRPs associated with other network nodes.

These exemplary methods can also include, based on the first positioning measurements and transmission directions of the first plurality of beams, obtaining a second plurality of beams that differs from the first plurality of beams by at least one beam (e.g., subset, superset, partially overlapping, etc.). These exemplary methods can also include obtaining second positioning measurements on the second plurality of beams.

In some embodiments, these exemplary methods can also include sending the first positioning measurements to the wireless network. In such embodiments, obtaining the second plurality of beams can include receiving, from the wireless network, information identifying the second plurality of beams. In such embodiments, obtaining the second positioning measurements can include performing the second positioning measurements of second RS on the second plurality of beams identified by the information from the wireless network.

In some of these embodiments, the second RS can be positioning reference signals (PRS) and the first RS can be one of the following: PRS, synchronization signal/PBCH blocks (SSBs), or channel state information reference signals (CSI-RS). In some of these embodiments, the first positioning measurements comprise signal-to-noise ratio (SNR) measurements and the second positioning measurements comprise reference signal time difference (RSTD) measurements.

In some of these embodiments, these exemplary methods can also include receiving information identifying the first plurality of beams in system information (SI) broadcast by the network node. In such embodiments, obtaining the second plurality can include determine a plurality of position quality metrics based on the first positioning measurements and on the transmission directions; and, when the determined position quality metrics are worse than a predetermined threshold, sending a request for a list of preferred beams to the network node. Each position quality metric can be associated with a different combination of beams from the first plurality. In such embodiments, the information identifying the second plurality of beams is received from the network node via unicast signaling in response to the request.

In other embodiments, the first positioning measurements can be sent to the wireless network together with a request for a list of preferred beams. In such embodiments, the information identifying the second plurality of beams can be received in response to the request.

In other embodiments, obtaining the second positioning measurements can include selecting, from the first positioning measurements, the second positioning measurements corresponding to the second plurality of beams. In such embodiments, the first positioning measurements can include SNR measurements and RSTD measurements, e.g., such that the selected second positioning measurements also include RSTD measurements.

In some of these embodiments, obtaining the second plurality can include selecting, as the second plurality, a predetermined number of the first plurality that maximizes a position quality metric computed from SNR measurements of the first positioning measurements and from the transmission directions of the first plurality. In some embodiments, obtaining the second plurality can be based on a position quality metric that distinguishes between LOS and non-LOS propagation conditions associated with respective individual beams of the first plurality.

In some embodiments, these exemplary methods can also include sending the second positioning measurements to the wireless network (e.g., for UE-assisted positioning); or determining a UE position based on RSTD measurements comprising the second positioning measurements (e.g., for UE-based positioning).

Other embodiments include network nodes (e.g., eNBs, gNBs, E-SMLCs, LW's, SLPs, etc. or components thereof) or user equipment (UEs, e.g., wireless devices, IoT devices, etc. or component thereof) configured to perform operations corresponding to any of the exemplary methods described herein. Other embodiments include non-transitory, computer-readable media storing program instructions that, when executed by processing circuitry, configure such network nodes or UEs to perform operations corresponding to any of the exemplary methods described herein.

These and other objects, features, and advantages of embodiments disclosed herein will become apparent upon reading the following Detailed Description in view of the Drawings briefly described below.

DETAILED DESCRIPTION

Figure 1:
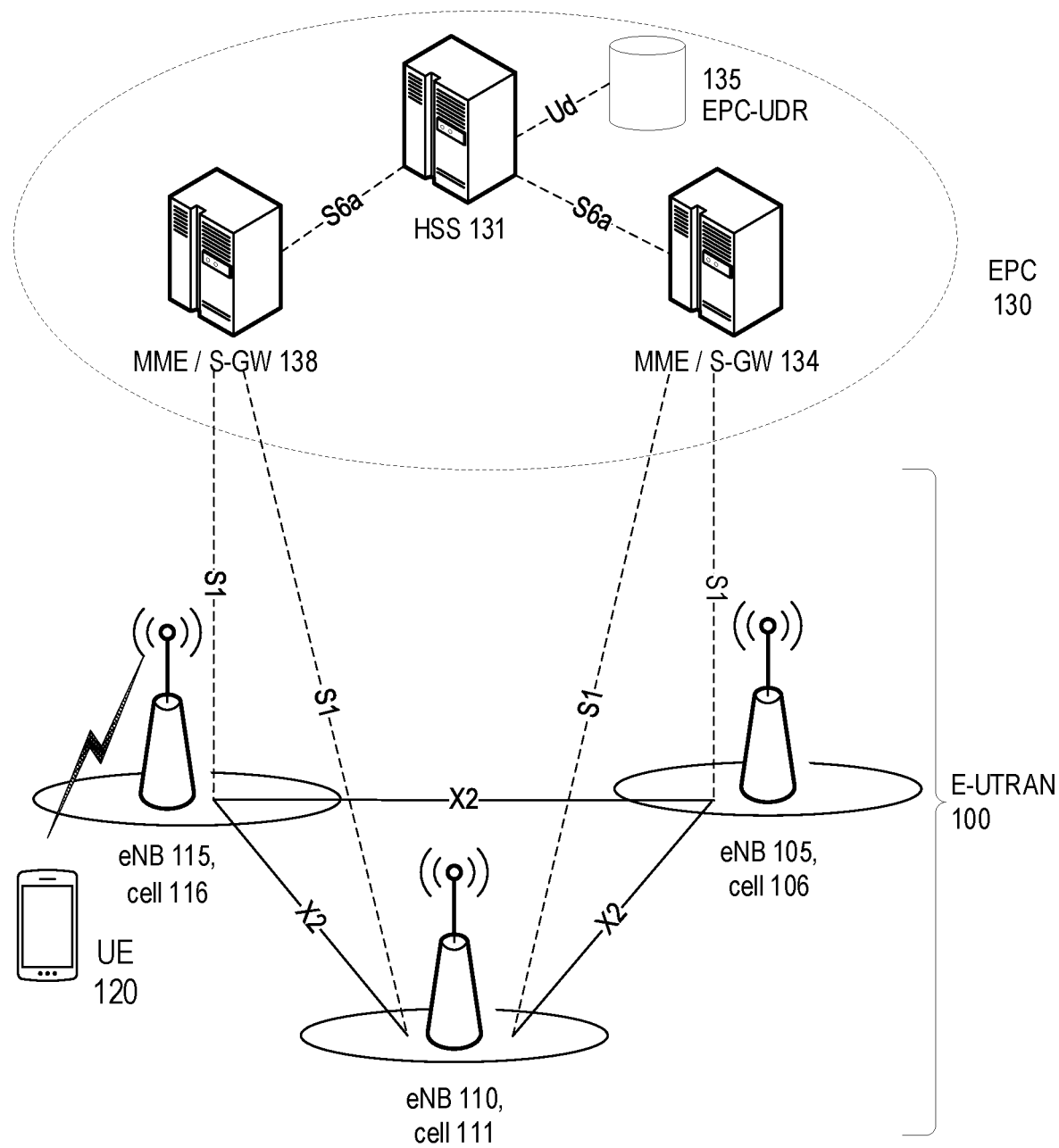
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
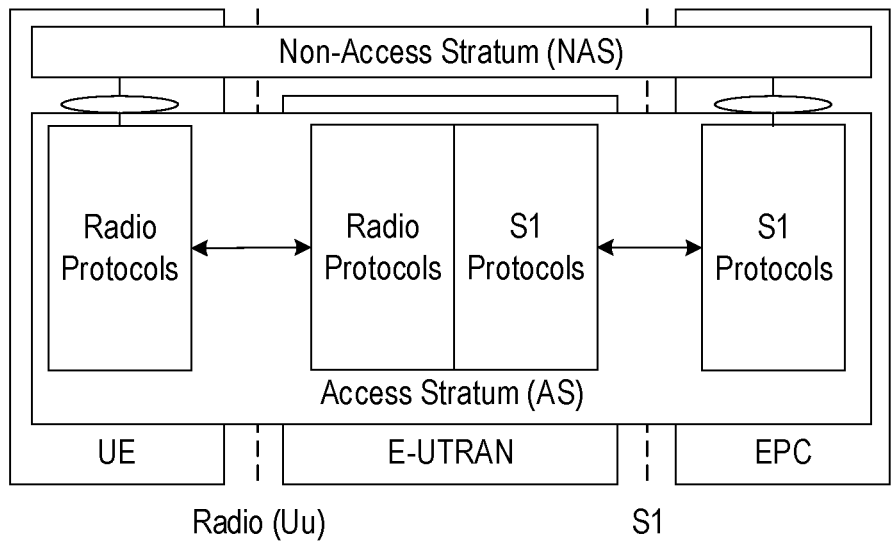
FIG. 2A is a high-level block diagram of an exemplary E-UTRAN architecture in terms of its constituent components, protocols, and interfaces.
Figure 2B:
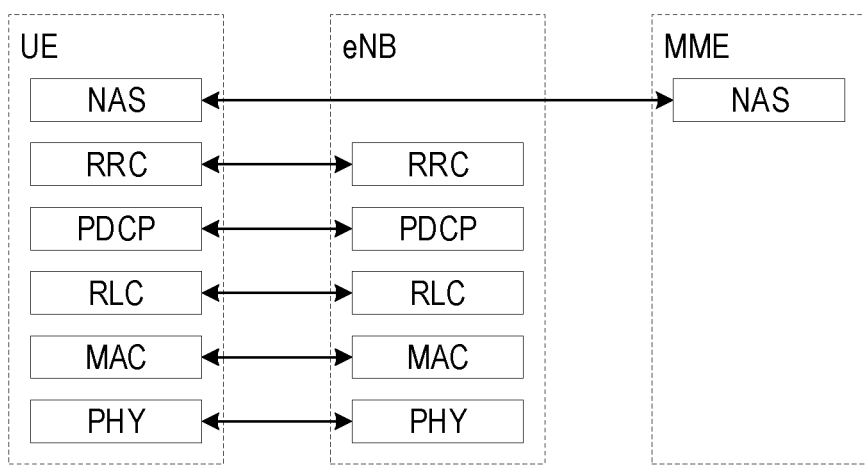
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

Location server: As used herein, "location server" can refer to a network node with positioning functionality, e.g., ability to provide assistance data and/or request positioning measurements and/or calculate a location based on positioning measurements. A location server may or may not be part of a base station.

Positioning signals: As used herein, "positioning signals" may include any signal or channel to be received by the UE for performing a positioning measurement such as a DL reference signal, PRS, SSB, synchronization signal, DM-RS, CSI-RS, etc.

Positioning measurements: As used herein, "positioning measurements" may include timing measurements (e.g., time difference of arrival, TDOA, RSTD, time of arrival, TOA, Rx-Tx, RTT, etc.), power-based measurements (e.g., RSRP, RSRQ, SINR, etc.), and/or identifier detection/measurement (e.g., cell ID, beam ID, etc.) that are configured for a positioning method (e.g., OTDOA, E-CID, etc.). UE positioning measurements may be reported to a network node or may be used for positioning purposes by the UE.

Positioning beam: As used herein, a "positioning beam" can include any beam carrying at least one positioning signal and/or that is used for a positioning purpose such as for measurements supporting one or more positioning methods (e.g., OTDOA, AOA, etc.). A positioning beam can have its own explicit identity or can be identified through an index associated with a specific signal that the beam carries.

Position quality: As used herein, "position quality" can correspond to an indicator of the position estimation error. Position quality can be proportional to GDOP in case of line-of-sight (LOS) conditions. However, it might differ in non-LOS (NLOS) channel conditions. In NR, for example, position quality can take into account angular and SNR information for NR beams.

GDOP information: As used herein, "GDOP information" (or more simply, "GDOP") can correspond to a ratio of position determination error to range measurement error, whereby lower GDOP indicates better positioning accuracy. For example, GDOP can be computed based on the locations of the positioning signal sources (e.g., base-stations, TPs, etc.) and the UE performing the positioning measurements.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Furthermore, the term "beam" is used herein in relation to a cell (or UE) that is employing "beamforming." As such, the terms "beamforming configuration" and "beam configuration" are used interchangeably. "Beamforming" can include any of the following arrangements: a cell consisting of or comprising multiple beams; transmitting two or more SSBs in a single cell from the same location; using analog, digital, or hybrid beamforming (as described below) in the transmitting node; transmitting different signals in two or more different directions in the same cell from the same location; transmitting signals from different transmitter branches (comprising one or more antenna elements); transmitting in mmW frequency range (e.g., FR2 or above 6 GHz) in which beams are needed to overcome increased path loss. A UE can determine and/or report the number of detected beams, per cell or per carrier. A UE can also have a measurement capability in terms the maximum number of beams the UE is expected to be able to handle at any given time.

In some cases, a beam may be associated with a reference signal ID, such as SSB ID on a carrier where SSBs are present, or other signal ID (e.g., DM-RS ID or CSI-RS ID) on carriers where SSBs are not transmitted but the other signals (e.g., DM-RS or CSI-RS) are used to differentiate beams. Furthermore, a positioning signal may be associated with a beam via a colocation or quasi-colocation property with respect to a signal characterizing the beam, e.g., co-located or quasi-collocated with the corresponding SSB and/or CSI-RS.

Herein, the term "type of beam" (or "beam type") can be used to characterize and/or categorize beams based on one or more specific properties, such: beam coverage (beams with small coverage, macro coverage, etc.), beam width, beam size, beam orientation (vertical, horizontal, etc.), environment (indoor beam or outdoor beam), mobility (statically or semi-statically configured beam or moving beam), etc.

As briefly mentioned above, narrow high-gain beams are used in 5G/NR to compensate for high path loss in mmW bands. In such case, the list of possible beams to be used for UE positioning can grow quite large, which creates various issues, problems, and/or difficulties in relation to the network providing the positioning assistance data to UEs. This is discussed in more detail after the following discussion of 5G/NR network architecture and LTE and NR positioning architectures.

Figure 3:
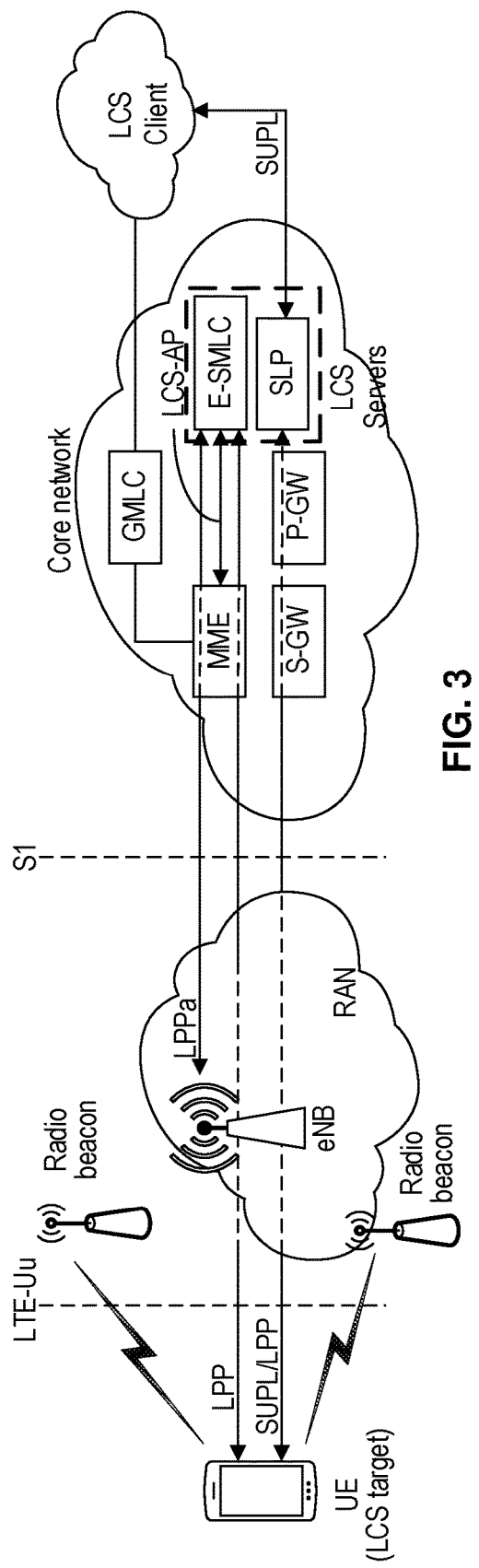
FIG. 3 illustrates a high-level architecture for supporting UE positioning in LTE networks.

FIG. 3 shows an exemplary positioning architecture within an LTE network. Three important functional elements of the LTE positioning architecture are LCS Client, LCS target, and LCS Server. The LCS Server is a physical or logical entity (e.g., as embodied by the E-SMLC or SLP in FIG. 3) that manages positioning for an LCS target (e.g., as embodied by the UE in FIG. 3) by collecting measurements and other location information, assisting the terminal in measurements when necessary, and estimating the LCS target location.

In general, LCS Servers are located in a Core Network (CN, e.g., EPC) and communicate with and/or via other CN nodes and/or functions such as MME, S-GW, and Packet Data Network Gateway (P-GW). The E-SMLC is responsible control-plane (CP) positioning and communicates with various entities using different protocols. For example, E-SMLC communicates with MME via the LCS-AP protocol, with the RAN (e.g., E-UTRAN) via the LPPa protocol (which can be transparent to MME), and with the LCS target via the LPP protocol (which can be transparent to both RAN and MME). In contrast, the SLP is responsible for user-plane (UP) positioning procedures. The SLP communicates with the UE via LPP and/or secure user plane location (SUPL) protocols, which can be transparent to other UP entities including RAN, S-GW, and P-GW. The LTE radio interface between RAN and UE is also referred to as LTE-Uu.

An LCS Client is a software and/or hardware entity that interacts with an LCS Server for the purpose of obtaining location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can be originated from the terminal or a network node or external client. For example, an external LCS client can communicate with SLP via SUPL and with E-SMLC via GMLC and MME.

In the LTE architecture shown in FIG. 3, position calculation can be conducted, for example, by the LCS Server (e.g., E-SMLC or SLP) or by the LCS target (e.g., a UE). The former approach corresponds to the UE-assisted positioning mode when it is based on UE measurements, whilst the latter corresponds to the UE-based positioning mode. The following positioning methods are supported in LTE:

Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).

Assisted GNSS. The UE receives and measures Global Navigation Satellite System (GNSS) signals, supported by assistance information provided to the UE from E-SMLC.

OTDOA (Observed Time Difference of Arrival). The UE receives and measures LTE signals transmitted by the RAN (including eNBs and radio beacons), supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

In addition, one or more of the following positioning modes can be utilized in each of the positioning methods listed above:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

The detailed assistance data may include information about network node locations, beam directions, etc. The assistance data can be provided to the UE via unicast or via broadcast.

Figure 4:
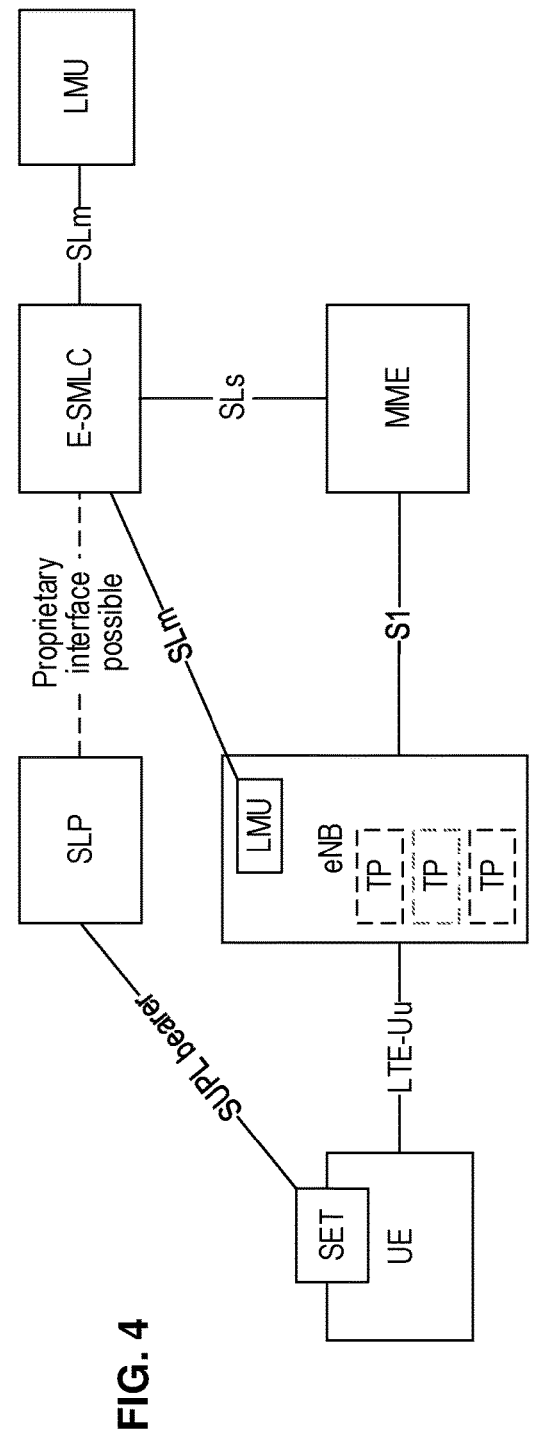
FIG. 4 shows a more detailed network diagram of an LTE positioning architecture.

FIG. 4 shows another view of an exemplary positioning architecture in an LTE network. For example, FIG. 4 illustrates how secure user plane location (SUPL) techniques can be supported in LTE networks. In general, SUPL is run on top of the generic LTE user-plane protocol stack. The SUPL solution includes a location server—known as SUPL location platform (SLP)—that communicates via a SUPL bearer with a SUPL-enabled terminal (SET), which can be software and/or hardware components of a UE. The SLP also may have a proprietary interface to the E-SMLC, which is the location server for control-plane positioning in LTE.

The E-SMLC can communicate with location measurement units (LMUs) via SLm interfaces. As shown in FIG. 4, LMUs can be standalone or integrated with an eNB. An eNB also may include, or be associated with, one or more transmission points (TPs). The E-SMLC communicates to UEs via the serving MME and eNB, using the respective SLs, S1, and LTE-Uu interfaces shown in FIG. 4. Although not shown, the RRC protocol is used to carry positioning-related information (e.g., to/from E-SMLC) between the UE and the eNB.

Figure 5:
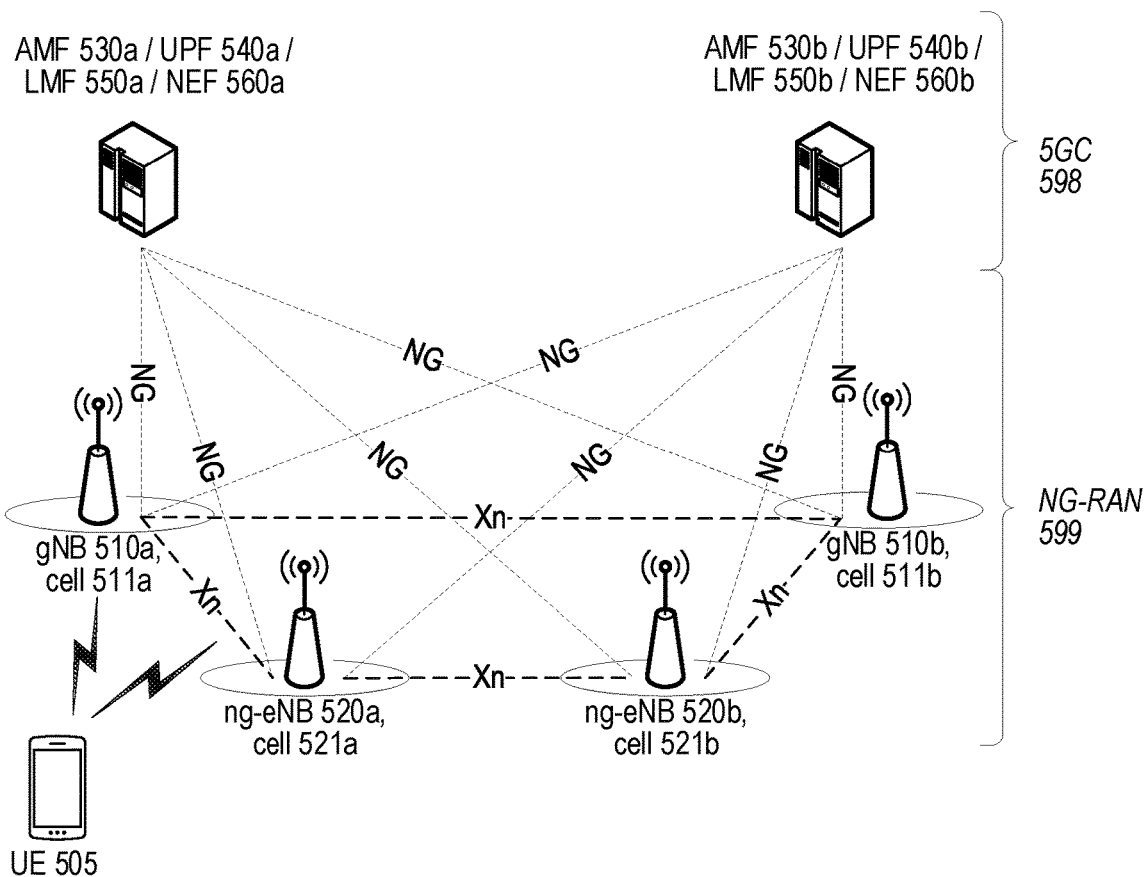
FIG. 5 shows a high-level view of an exemplary 5G network architecture, according to various exemplary embodiments of the present disclosure.

As mentioned above, positioning is also expected to be an important application for 5G networks. FIG. 5 shows a high-level view of an exemplary 5G network architecture, including a Next Generation Radio Access Network (NG-RAN) 599 and a 5G Core (5GC) 598. As shown in the figure, NG-RAN 599 can include gNBs 510 (e.g., 510a,b) and ng-eNBs 520 (e.g., 520a,b) that are interconnected with each other via respective Xn interfaces. The gNBs and ng-eNBs are also connected via the NG interfaces to 5GC 598, more specifically to the AMF (Access and Mobility Management Function) 550 (e.g., AMFs 530a,b) via respective NG-C interfaces and to the UPF (User Plane Function) 540 (e.g., UPFs 540a,b) via respective NG-U interfaces. Moreover, the AMFs 520a,b can communicate with one or more location management functions (LMFs, e.g., LMFs 550a,b) and network exposure functions (NEFs, e.g., NEFs 560a,b). The AMFs, UPFs, LMFs, and NEFs are described further below.

Each of the gNBs 510 can support the NR radio interface including frequency division duplexing (FDD), time division duplexing (TDD), or a combination thereof. In contrast, each of ng-eNBs 520 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 511a-b and 521a-b shown as exemplary in FIG. 5. As mentioned above, the gNBs and ng-eNBs can also use various directional beams to provide coverage in the respective cells. Depending on the particular cell in which it is located, a UE 505 can communicate with the gNB or ng-eNB serving that particular cell via the NR or LTE radio interface, respectively.

Each of the gNBs 510 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

Deployments based on different 3GPP architecture options (e.g., EPC-based or 5GC-based) and UEs with different capabilities (e.g., EPC and 5GC) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

Figure 6:
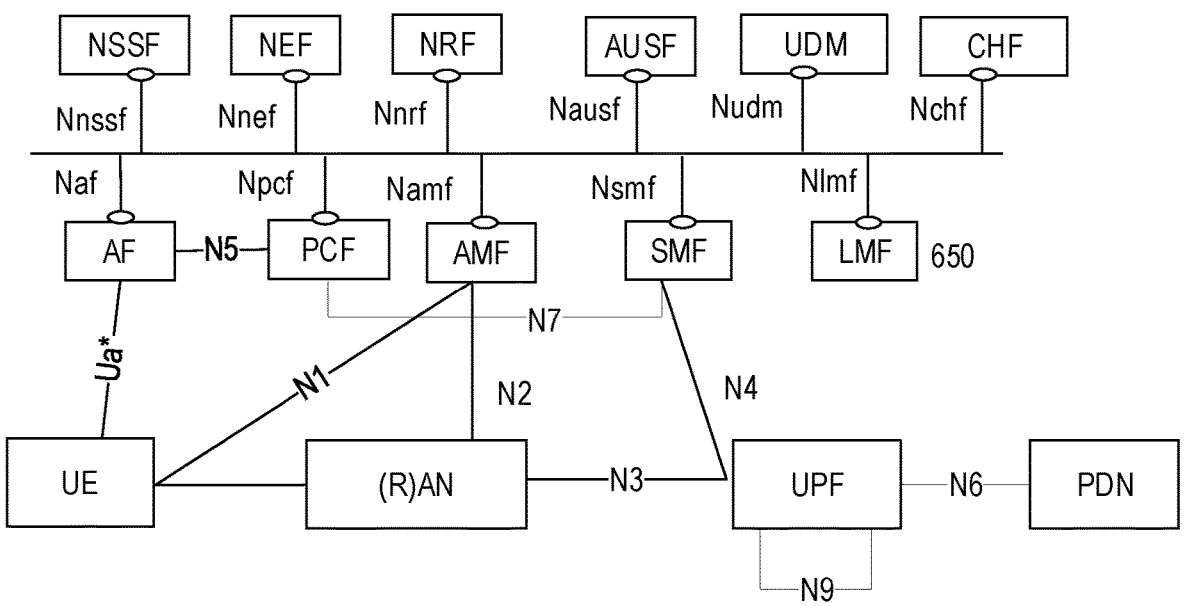
FIG. 6 shows an exemplary non-roaming 5G reference architecture with service-based interfaces and various network functions (NFs), as further described in 3GPP TS 23.501.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 6 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e. signaling layer), the control of flow resources according to what has been negotiated with the network. An AF communicates dynamic session information to PCF (via N5 interface), including description of media to be delivered by transport layer. AFs also communicate with UEs via the Ua* reference point.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g. bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g. compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface (labelled 650 in FIG. 6)—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function shown in FIG. 4 is similar to the HSS in LTE/EPC networks discussed above. UDM supports Generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The services in 5GC will likely be built in a stateless way, such that the business logic and data context will be separated. For example, the services can store their context externally in a proprietary database. This can facilitate various cloud infrastructure features like auto-scaling or auto-healing. The NRF allows every NF to discover the services offered by other NFs, and Data Storage Functions (DSF) allow every NF to store its context. In addition, the NEF provides exposure of capabilities and events of the 5GC to application functions (AFs) within the 5GC and outside of the 5GC. For example, NEF provides a service that allows an AF to provision specific subscription data (e.g., expected UE behavior) for various UEs.

Figure 7:
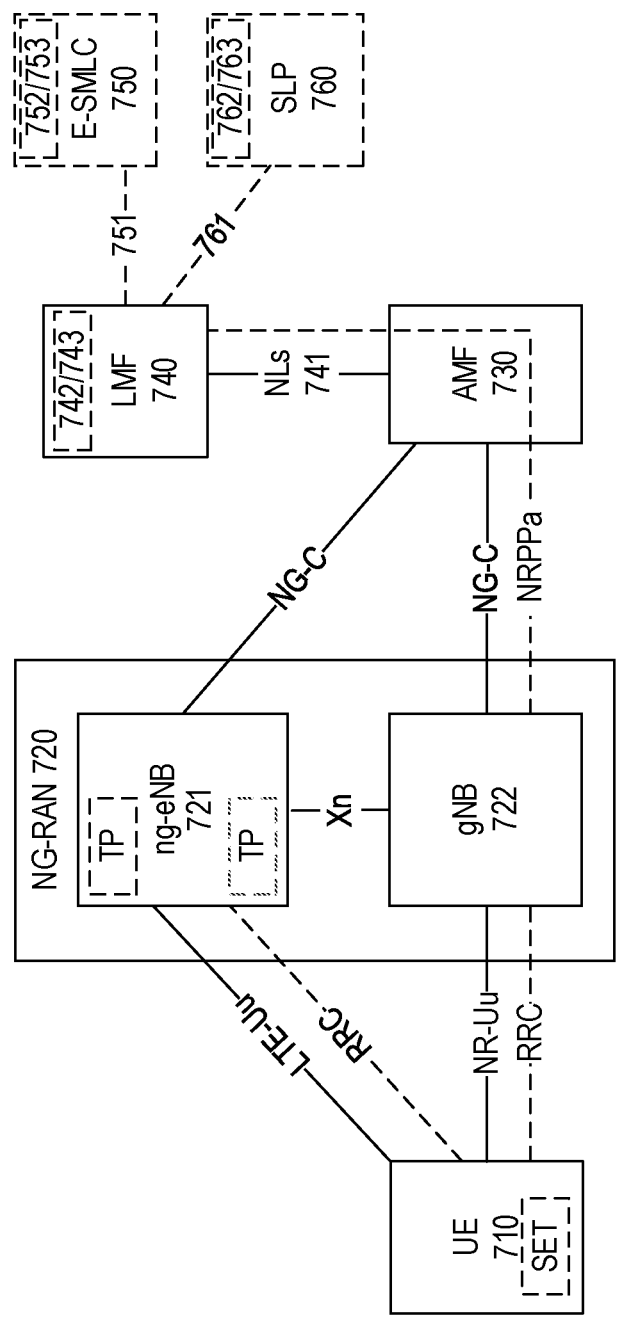
FIG. 7 shows an exemplary high-level positioning architecture within an NR network, which includes the NG-RAN and the 5GC.

FIG. 7 is a block diagram illustrating a high-level architecture for supporting UE positioning in 5G networks. As shown in FIG. 7, the NG-RAN 720 can include nodes such as gNB 722 and ng-eNB 721, similar to the architecture shown in FIG. 5. Each ng-eNB may control several transmission points (TPs), such as remote radio heads. Moreover, some TPs can be "PRS-only" for supporting positioning reference signal (PRS)-based E-UTRAN operation.

According to NR principles, gNB 722 communicates with UE 710 via RRC over the NR radio interface, also referred to as NR-Uu. Likewise, according to LTE principles, ng-eNB 721 communicates with UE 710 via RRC over the LTE radio interface, also referred to as LTE-Uu. As discussed above in relation to FIG. 4, UE 710 may include a SET.

In addition, the NG-RAN nodes communicate with an AMF 730 in the 5GC via respective NG-C interfaces (both of which may or may not be present), while AMF 730 and LMF 740 communicate via an NLs interface 741. In addition, positioning-related communication between UE 710 and the NG-RAN nodes occurs via the RRC protocol, while positioning-related communication between NG-RAN nodes and LMF occurs via an NRPPa protocol. Optionally, the LMF can also communicate with an E-SMLC 750 and a SUPL 760 in an LTE network via communication interfaces 751 and 761, respectively. Communication interfaces 751 and 761 can utilize and/or be based on standardized protocols, proprietary protocols, or a combination thereof.

LMF 740 can also include, or be associated with, various processing circuitry 742, by which the LMF performs various operations described herein. Processing circuitry 742 can include similar types of processing circuitry as described herein in relation to other network nodes. LMF 740 can also include, or be associated with, a non-transitory computer-readable medium 743 storing instructions (also referred to as a computer program program) that can facilitate the operations of processing circuitry 742. Medium 743 can include similar types of computer memory as described herein in relation to other network nodes.

Similarly, E-SMLC 750 can also include, or be associated with, various processing circuitry 752, by which the E-SMLC performs various operations described herein. Processing circuitry 752 can include similar types of processing circuitry as described herein in relation to other network nodes. E-SMLC 750 can also include, or be associated with, a non-transitory computer-readable medium 753 storing instructions (also referred to as a computer program program) that can facilitate the operations of processing circuitry 752. Medium 753 can include similar types of computer memory as described herein in relation to other network nodes.

Similarly, SLP 760 can also include, or be associated with, various processing circuitry 762, by which the SLP performs various operations described herein. Processing circuitry 762 can include similar types of processing circuitry as described herein in relation to other network nodes. SLP 760 can also include, or be associated with, a non-transitory computer-readable medium 763 storing instructions (also referred to as a computer program program) that can facilitate the operations of processing circuitry 762. Medium 763 can include similar types of computer memory as described herein in relation to other network nodes.

In a typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR measurements. NR may also support one or more of the following position methods:

Multi-RTT: The device (e.g. UE) computes UE Rx-Tx time difference and gNBs compute gNB Rx-Tx time difference. The results are combined to find the UE position based upon round trip time (RTT) calculation.

DL angle of departure (DL-AoD): gNB or LMF calculates the UE angular position based upon UE DL RSRP measurement results (e.g., of PRS transmitted by network nodes).

UL angle of arrival (UL-AoA): gNB calculates the UL AoA based upon measurements of a UE's UL SRS transmissions.

Each of the NR positioning methods can be supported in UE-assisted, UE-based or UE-standalone modes, similar to LTE discussed above. A new work item (WI) on "NR Positioning Support" has been agreed for 3GPP Rel-16. The objectives include "study and, if agreed, specify system level aspects of the DL-only UE based positioning". According to this WI, the use cases where UE-based DL OTDOA positioning are beneficial include: verifying that UE based GNSS location results are accurate; pedestrian or low-mobility navigations in urban canyon; and hybrid Solution combining GNSS results and NR RAT-dependent results (e.g., less than three GNSS satellites available but dense NR deployment).

Multi-antenna technology can be used to improve various aspects of a communication system (such as 5G/NR networks discussed above), including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas can provide diversity gain against radio channel fading. A multi-antenna transmitter can achieve diversity even without any knowledge of the channels between the transmitter and the receiver, so long as there is low mutual correlation between the channels of the different transmit antennas.

In other configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals.

In relatively good channel conditions, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. These techniques are commonly referred to as "spatial multiplexing" or multiple-input, multiple-output (MIMO) antenna processing.

Figure 8:
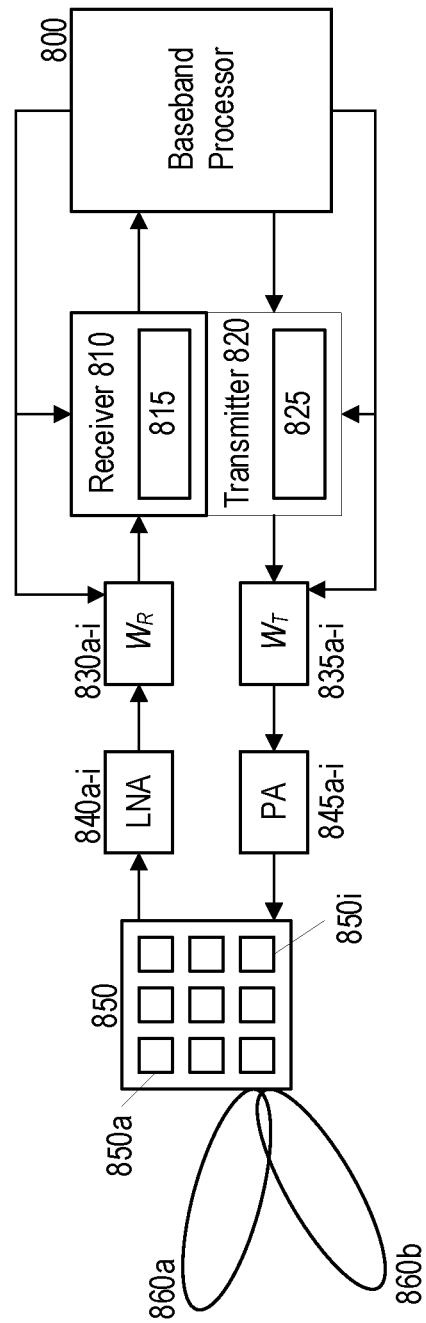
FIG. 8 shows a block diagram of an exemplary multi-antenna transceiver apparatus and/or device according to various exemplary embodiments of the present disclosure.

FIG. 8 shows a block diagram of an exemplary multi-antenna transceiver apparatus and/or device according to various exemplary embodiments of the present disclosure. For example, the exemplary transceiver can be a component of a UE or base station, including those described below in relation to other figures. In such configurations, the transceiver apparatus shown in FIG. 8 can provide beamforming, diversity gains, and/or spatial multiplexing in the manner described above.

The exemplary apparatus shown in FIG. 8 can also include, e.g., an antenna array 850 that can comprise a plurality of individual antenna elements arranged in a particular pattern, such as, e.g., exemplary antenna elements 850a to 850i arranged in an exemplary 3-by-3 grid. In some exemplary embodiments, the antenna array 850 can be arranged as an M-by-N array of elements, where $M \geq 1$ and $N > 1$. In some exemplary embodiments, the antenna elements 850a to 850i can be arranged in a rectangular grid with equal spacing in one or both dimensions; however, other exemplary arrangements of the elements comprising the array are possible and are within the scope of the present disclosure, including non-grid and/or irregular arrangements. In addition, each element of the antenna array 850 can have various physical forms including dipole, patch, cross dipole, inverted F, inverted L, helix, Yagi, rhombic, lens, and/or any another type of antenna topology known to persons of ordinary skill.

Elements 850a to 850i can utilize various polarization patterns known to persons of ordinary skill, including horizontal, vertical, circular, and cross polarization. For example, elements 850a to 850i—as well as their arrangement in the array 850—can be designed and/or configured especially for the particular operating frequency (e.g., 8 GHz, 10 GHz, 300 GHz, etc.) and device (e.g., mobile or fixed-location terminal, cellular phone, handset, laptop, tablet, etc.) in which the exemplary apparatus of FIG. 8 can be used.

According to certain exemplary embodiments of the present disclosure, the antenna elements 850a to 850i can be used for receiving and/or transmitting signals in combination with, respectively, other receiving and transmitting circuitry comprising the exemplary apparatus. The receiving circuitry can comprise a plurality of low-noise amplifiers (LNAs) 840a through 840i, each of which can amplify a signal received from a corresponding antenna element 850a through 850i. The exemplary apparatus can further comprise a plurality of receive gain/phase controls 830a through 830i, each of which can receive a signal output from a corresponding (LNAs) 840a through 840i. In some exemplary embodiments, the receive gain/phase controls 830a through 830i (denoted $W_R$) can comprise a receiver beamformer that can be controlled by, e.g., one or more processors 800. The outputs of the receive gain/phase controls 830a through 830i are provided to a receiver block 810, which can comprise a receive conversion circuit 815. The inputs to block 810 can be at a particular radio frequency (RF), in which case block 810 can comprise circuitry configurable to translate the signals to an intermediate frequency (IF). Nevertheless, the skilled person can readily comprehend that RF-to-IF conversion can alternately occur prior to the signals reaching receiver block 810. As indicated herein, references to "processor" should be understood to mean one or more processors, including one or more computer processors, signal processors, or other processing circuitry.

Receive conversion circuit 815 can also include one or more analog-to-digital converters (ADCs) that sample the input signals, e.g., at IF. As such, the output of circuit 815 can comprise one or more streams of digitized samples that are provided to a baseband processor 800, which can provide one or more receiver control signals for controlling various operational aspects of, e.g., receive gain/phase controls 830a through 830i, receive conversion circuit 815, etc.

Similarly, processor 800 can provide one or more streams of digitized samples to transmitter block 820, which can comprise a transmit conversion block 825 that can include one or more digital-to-analog converters (DACs, not shown). The output of block 820 (e.g., the output of transmit conversion block 828) can comprise a plurality of analog signals, each of which can be at RF or IF, as described above for the receiving circuitry. Each of the analog signals output by transmitter block 820 can be applied to a corresponding transmit gain/phase control 835a through 835i (denoted $W_T$). Processor 800 can also provide one or more transmitter control signals for controlling various operational aspects of, e.g., transmit gain/phase controls 835a through 835i, transmit conversion block 828, etc. In some exemplary embodiments, transmit gain/phase control 835 can comprise a transmit beamformer that can be controlled by, e.g., processor 800. Each of the signals output by transmit gain/phase control 835a through 835i can be applied to a corresponding transmit power amplifier (PA) 845a through 845i. The amplified outputs of the PAs can be applied to respective corresponding antenna array elements 850a through 850i.

In some embodiments, processor 800 can utilize a direction-of-arrival estimate or other available information to determine appropriate weights (e.g., $W_R$ or $W_T$) to cause the antenna array 850 to produce one or more beam patterns directed to a particular angular direction relative to the antenna array. For example, as shown in FIG. 8, by applying the appropriate weights (e.g., $W_R$ or $W_T$) to the signals received from the antenna elements 850a through 850i, the antenna array 850 can capture signals and/or multipath components that are incident in the directions of arrival corresponding to beams 860a and 860b while rejecting signals and/or multipath components that are incident other directions of arrival. In other exemplary embodiments, the weights can comprise and/or incorporate a precoder matrix that facilitates directing one or more beams directed to particular angular directions, e.g., for a beam sweep or to another device (e.g., base station) located at a specific position.

Processor 800 can program and/or configure receive gain/phase controls 830 and/or transmit gain/phase controls 835 with weights (e.g., $W_R$ or $W_T$, respectively) corresponding to the desired angular direction. Processor 800 can determine weights using various beam-steering or beam-forming algorithms know to persons of ordinary skill, including parametric algorithms and codebook-based algorithms. According to various exemplary embodiments, receive gain/phase controls 830 and/or transmit gain/phase controls 835 can comprise one or more programmable amplifiers that modifies the amplitude and/or phase of the signals (e.g., at RF or IF) from the array elements 850a through 850i. When no gain or phase adjustment of the signals to/from array elements 850a through 850i is required, the processor 800 can program the respective elements of controls 830 and/or 835 to unity gain/zero phase.

Processor 800 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 800 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

Receive conversion circuit 815 and transmit conversion circuit 828 can be configured in various ways in relation to antenna elements 850a-i. In an exemplary digital beamforming architecture, the signal from (or to) each antenna element is processed by a separate ADC (or DAC) and receive (or transmit) chain, such that processing of the received signals can be performed entirely in the digital domain. This exemplary architecture potentially allows directing beams in infinite directions, is able to support an arbitrary number of spatial streams and can provide spatial division multiplexing to communicate to multiple devices simultaneously.

In an exemplary analog beamforming architecture, the analog signals from (or to) the antenna elements are first combined by an analog phased array, either at radio frequency (RF) or at intermediate frequency (IF, e.g., before or after the mixer). The combined signal can then be processed by a single A/D (or D/A) converter. Since this design requires only one A/D or D/A, it can consume less energy compared to the fully digital approach. However, the analog phased array can be oriented in only one direction at a time, thereby limiting the multiple access and searching capabilities.

In an exemplary hybrid beamforming architecture, the available antenna elements can be divided into N clusters, each with multiple elements. In the receiver, signals from all antenna elements in a cluster are combined into a single analog signal, which is then individually digitized with a single ADC. In the transmitter, a single DAC can generate a composite analog signal that is then split into multiple signals, each fed to one antenna element of the cluster. Each cluster can generate a simultaneous beam independent of the other clusters, such that the device can transmit/receive N analog beams in N simultaneous directions.

In general, a base station (e.g., eNB, gNB, ng-eNB) employing multi-antenna arrays can cover its served geographic area (e.g., a cell) by a set of beams transmitted and received according to a pre-defined intervals and directions. Each beam can carry one or more reference signals and has an identifier that is associated with the reference signals carried by that particular beam. Such beams can be used for data communication with UEs in the served area, for radio resource management (RRM) of UEs, and for positioning of UEs.

Cell-specific reference signals were specified for UE RSTD measurements in 3GPP Rel-8. These reference signals were determined to be insufficient for OTDOA positioning, so Positioning Reference Signals (PRS) were introduced in Rel-9. PRS are pseudo-random, quadrature phase-shift keyed (QPSK) sequences that are mapped in diagonal patterns with shifts in frequency and time, thereby avoiding collision with CRS and an overlap with the control channels (PDCCH). It is expected that NR will use PRS transmission in positioning beams, especially for FR2 region (e.g., 24 GHz and above). If so, positioning beams will have beam identifiers based upon the PRS that they carry, similar to the identifiers for communication/RRM beams. In contrast to positioning beams, RRM beams carrying other reference signals (e.g., SSB or CSI-RS) are mainly used for UE RRM measurements, cell identification, and mobility.

Figure 9:
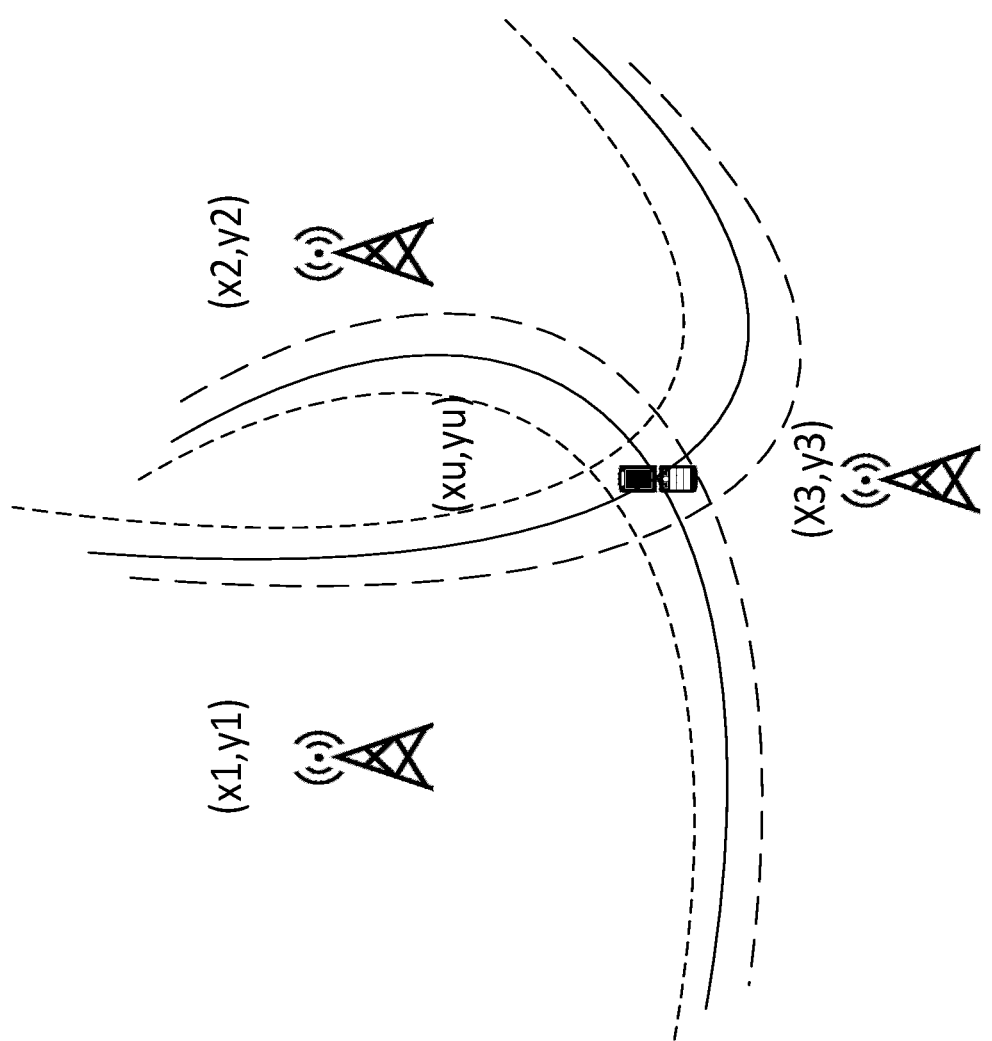
FIG. 9 shows an exemplary reference signal time difference (RSTD) measurement arrangement for observed time difference of arrival (OTDOA) UE positioning.

In OTDOA positioning, a UE measures the reference signal time difference (RSTD) between reference signals transmitted by a reference cell and reference signals transmitted by at least two neighbor cells. FIG. 9 shows an exemplary RSTD measurement arrangement for OTDOA positioning. For example, the UE located at unknown coordinate (xu, yu) measures a RSTD between transmissions from TP1 (located at known coordinate (x1, y1)) and transmissions from TP3 (located at known coordinate (x3, y3)) that can be expressed as:

$$RSTD_{3,1} = \sqrt{\left(\frac{(xu-x3)^2 + (yu-y3)^2}{c}\right)} - \sqrt{\left(\frac{(xu-x1)^2 + (yu-y1)^2}{c}\right)}. \quad (1)$$

As shown in FIG. 9, the above relation can be expressed as a hyperbola. A similar relation $RSTD_{3,2}$ can be derived between transmissions from TP3 and TP2, located at (x2, y2). The intersection of multiple hyperbolas—each representing an RSTD—indicates the approximate UE location (xu,yu) in FIG. 9.

In order to support UE-based OTDOA positioning, the network needs to provide various assistance data to the UE. This includes, at a minimum, a list of beams/cells to be used for positioning measurements; coordinates of the antenna transmission points (TPs) that provide the respective beams/cells; and the real time difference between corresponding transmissions of the respective beams/cells.

For UE based OTDOA positioning, the network can broadcast the known coordinates of beams/cells using Radio Resource Control (RRC) System Information Block (SIB) broadcast messages. However, the coordinates of each beam (e.g., longitude, latitude, height of TP providing the beam) constitutes around 100 bits. Because of PHY size limitation, it may not be possible to transmit more than 25 TP coordinates in one System information (SI) message, which can be maximum 2976 bits. If one considers other information such as cell ID, PRS ID, EARFCN, Real Time Difference (RTD), etc. that needs to be provided, the maximum number of TP coordinates in a single SI message is approximately 10.

As briefly mentioned above, narrow high-gain beams may be necessary in NR to compensate for high path loss in mmW bands. In such case, the list of possible beams to be used for UE positioning can grow quite large, such that the network may have insufficient broadcast SI capacity to convey the entire beam list to all UEs operating in a cell. Moreover, due to limitations on resources available for SI broadcast, it is generally not feasible to use multiple SI messages to convey positioning assistance data. Furthermore, even if sufficient capacity exists, a broadcast beam list would be overinclusive since UEs at different positions will only be able to receive a position-dependent subset of the beams in the list. This not only wastes capacity but also increases the UE complexity needed to determine the suitable beams in the large list.

Accordingly, the network should keep track of beam geometry and evaluate which beams or cells co-ordinates should be broadcast so that a majority and/or substantial portion of UEs in a cell can compute their respective locations with high accuracy. Furthermore, as mentioned above, PRS should be transmitted in FR2 beams to compensate for the higher path loss. The PRS transmission to all beam sweeping directions results in an unnecessary transmission of PRSs and thus a mechanism is needed to select the most suitable beams for PRS transmission. After receiving positioning assistance data determined by the network according to these criteria, a UE can determine its location accurately and without having the requirement to process large number of beams in the beam list.

Exemplary embodiments of the present disclosure can address these and other issues, problems, and/or difficulties by providing a flexible technique to initialize and/or refine a list of beams/TPs used for UE-based and/or UE-assisted TDOA-based positioning in NR networks. For example, this technique can utilize a position-quality metric derived from the TDOA Fisher Information Matrix, which relies on SNR and angular information. In some embodiments, this metric can be related to geometric dilution of precision (GDOP) but differs for beams that experience non-line-of-sight (NLOS) conditions between the TP and the UE.

The exemplary techniques can provide various advantages and/or benefits. For example, they can enhance the accuracy of UE position determination via identification of a set of beams/cells that facilitate a complementary set of UE measurements, e.g., according to a position quality metric. As another example, the techniques can identify a set of beams/cells that are more optimal for the capacity of a single SIB broadcast message. Furthermore, such techniques can reduce UE processing complexity by avoiding the need to parse a large number of beams/cells to evaluate which are best in terms of position quality metric and/or GDOP. In addition, such techniques can allow the network to determine which beams provide relatively poor position quality to the served UEs, such that the network can turn off such beams to conserve energy. Put differently, by employing a positioning-specific metric, such techniques can facilitate the adaptation and/or optimization of PRS transmission in a manner that increases the efficiency of network resource utilization.

Certain exemplary embodiments can utilize a position quality metric given by:

$$Q = -\log \det(J_k) \quad (2)$$

where $J_k$ is a position information matrix (e.g., a Fisher matrix of a TDOA system) given by:

$$J = \frac{8\pi^2 \beta^2}{c^2 \left(\sum_{k=1}^{K} SNR_k + K_b\right)} \left(K_b \sum_{k=1}^{K} SNR_k R(\phi_k) + \sum_{q=2}^{K} SNR_1 SNR_q R(\phi_1, \phi_q)\right), \quad (3)$$

and where $\phi_k$ is the transmission direction (i.e., azimuth angle) of the beam used for the measurement of $SNR_k$, calculated from transmitter perspective relative to some reference angle in a global or local coordinate system (e.g., earth-centered earth-fixed, ECEF). According to one embodiment, azimuth can be measured counterclockwise with respect to the x-axis of the coordinate system employed (e.g., zero degrees=east). Various other terms in (3) can be defined as follows:

$$S_k = \sum_{n=1}^{k} SNR_n, \quad (4)$$

$$K_b \triangleq 1/(\sigma_t^2 8\pi^2 \beta^2), \quad (5)$$

$$R(\theta_i) = \begin{bmatrix} \cos^2(\theta_i) & \cos(\theta_i)\sin(\theta_i) \\ \cos(\theta_i)\sin(\theta_i) & \sin^2(\theta_i) \end{bmatrix}, \quad (6)$$

$$R(\theta_1, \theta_q) = \begin{bmatrix} \cos(\theta_1) - \cos(\theta_q) \\ \sin(\theta_1) - \sin(\theta_q) \end{bmatrix}^T \begin{bmatrix} \cos(\theta_1) - \cos(\theta_q) \\ \sin(\theta_1) - \sin(\theta_q) \end{bmatrix}, \quad (7)$$

and $\Theta_i$ is an arbitrary angular variable that can represent $\phi_k$ discussed above. Other embodiments can utilize alternative formulations of Q than shown above in (2), such as trace of inverse of $J_k$. Equation (3) can also be rewritten into iterative form as:

$$J_k = J_{k-1}\gamma_k + \frac{\eta}{S_k}\left(K_b R(\phi_k) + \sum_{q \in I_{k=1}} SNR_q R(\phi_q, \phi_k)\right), \quad (8)$$

$$\eta \triangleq \frac{8\pi^2\beta^2}{c^2}, \gamma_k \triangleq \frac{S_{k-1}}{S_k}, \quad (9)$$

$$Q_k = -\text{logdet}(J_k).$$

In the above, $I_k$ is the set of k beams used to compute $J_k$. According to the above formulation, the position information matrix increments by adding a new term determined by a direction $\phi_k$ and $SNR_k$. This term corresponds to a specific beam transmitted by a TRP. Selecting a beam that maximizes $J_k$ yields an optimum beam/TRP configuration for positioning. Put differently, an exemplary optimization algorithm can involve minimizing $Q_k$ (in (9)) by selecting the best K beams per TRP. Exemplary pseudocode for such an algorithm is given below, with reference to (8) and (9) above:

```
Input: N, {SNR_i, θ_i}
Output: I_N
1:    n_0 = beam index with maximum SNR
2:    I_N = {n_0}
3:    Compute J_0
4:    for k = 1 to K do
5:        for i = 1 to N_b - 1 and q ∉ B do
6:            Compute Q_k^i (9) for each i-beam
7:        end for
8:        n_i = arg min_i {Q_k^i}
9:        I_N = I_N ∪ {n_i}
10:       Update J̃_k (8)
11:   end for
12:   return I_N
```

For example, the value N can be based on a maximize size constraint, such as the maximum number of beams that can be indicated in SI broadcast by the network node. The N beams can include beams associated with the network node (e.g., originating from TRPs associated with the network node as well as beams associated with other network nodes (e.g., originating from TRPs associated with one or more network nodes serving neighboring cells).

The above-described embodiments that maximize $J_k$ based on a direction $\phi_k$ and $SNR_k$ are based on an objective of maximize position accuracy with a given number of beams. Even so, other embodiments can be based on different objects (e.g., reducing UE energy consumption) subject to the same or different constraints.

In certain embodiments involving UE-assisted OTDOA positioning, the position quality metric can used by the network to select the best TRPs and beams for positioning. Note that while a TRP typically includes both transmission and reception functionality, transmission functionality is most relevant to the present disclosure so "TP" and "TRP" may be used interchangeably. The network's TRP/beam selection can be based on any of the following use cases:

A1: prior to transmission of PRS;
A2: prior to position calculation; and
A3: upon request by a UE.

In use case A1, the selection method relies on the UE reports of SNR, RSRP, and/or RSRQ measured on reference signals transmitted by the TRPs. For the sake of brevity, the term "SNR" will be used to refer to any of these measurements unless specifically noted to the contrary. In some embodiments, these SNR measurements can be made by the UE during beam sweeping (e.g., of SSB) by the network. In other embodiments, these SNR measurements can be made by the UE based on PRS transmitted by the network, which may have a narrower beam width than SSB. The network can then associate reported beam SNRs with corresponding beam directions and compute the optimum TRP/beam set for positioning. Following the TRP/beam selection, the network can initiate the positioning session by transmitting PRS only in the selected beams, and subsequently receive RSTD measurements for the calculation of the UE location.

Figure 10:
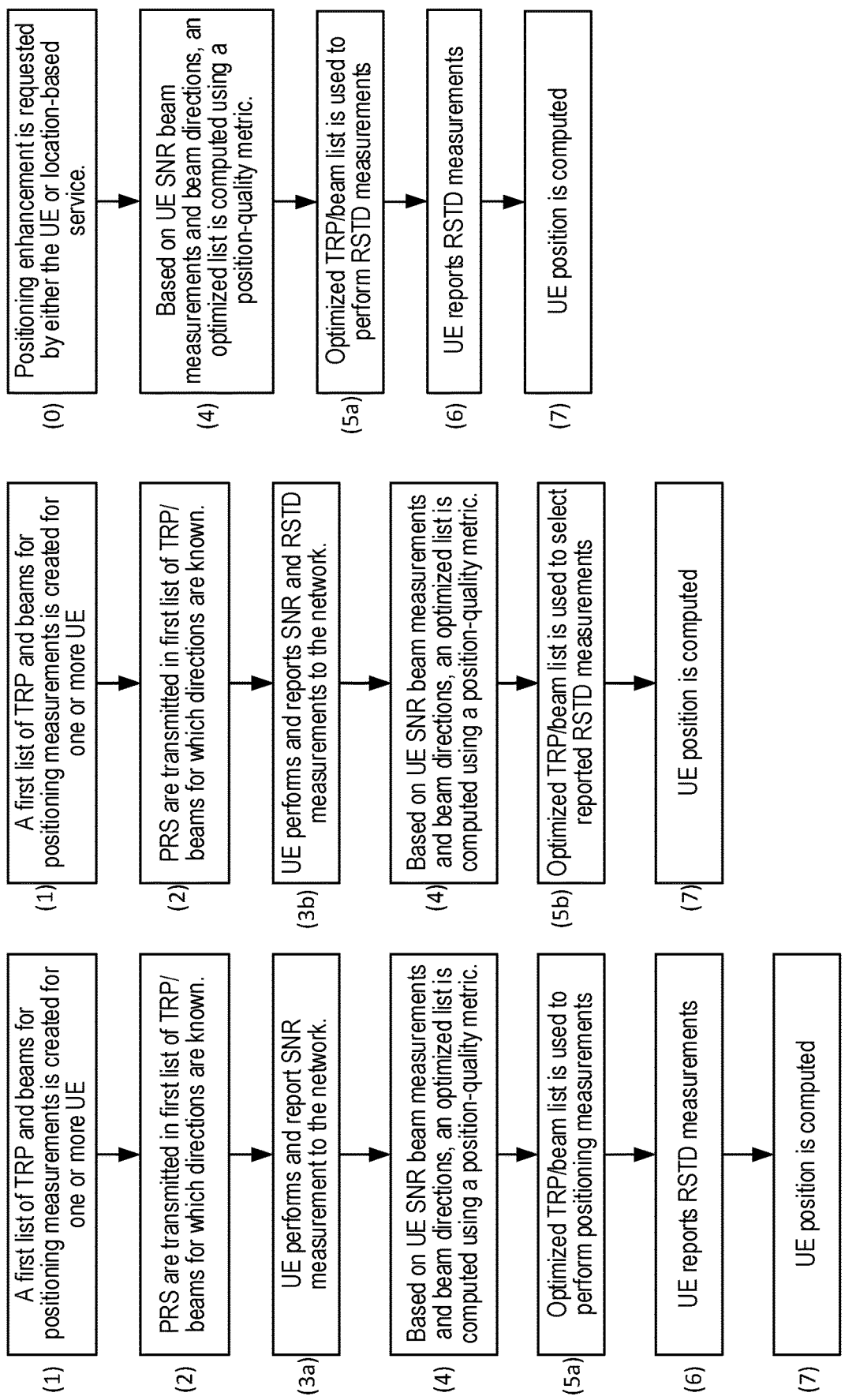
FIGS. 10A-10C show flow diagrams of respective procedures for different UE-assisted OTDOA positioning use cases, according to various exemplary embodiments of the present disclosure.

FIG. 10A is a flow diagram that depicts a procedure corresponding to the UE and network operations according to use case A1. In operation (1), the network creates a first list of TRPs and beams for positioning measurements for one or more UEs. In operation (2), the network transmits PRS in the first list of TRP/beams, for which the directions are known. In operation (3a), the UE performs and reports SNR measurements to the network for the first list of beams. In operation (4), based on UE SNR beam measurements and known beam directions, the network computes an optimized list using a position-quality metric and sends it to the UE. In operation (5a), the UE uses the optimized TRP/beam list to perform positioning measurements, which are reported to the network in operation (6) and used by the network to compute the UE's position in operation (7).

In use case A2, the network selection also relies on the UE SNR report of reference signals transmitted in the respective beams. Initially, the network creates a first list of TRPs/beams for positioning measurements of a UE, and transmits PRS in the beams comprising the list, for which the beam directions are known. The UE reports SNR and RSTD measurements corresponding to the first list, which the network associates with the known beam directions to determine an optimized list based on a position quality metric (e.g., as described above). The network calculates the UE position only based on the reported RSTD measurements associated with the optimized list.

FIG. 10B is a flow diagram that depicts a procedure corresponding to the UE and network operations according to use case A2. Identically numbered operations to those in FIG. 10A are functionally similar, and their descriptions will be omitted for brevity. In operation (3b), the UE performs and reports both SNR and RSTD measurements to the network for the first list of beams. In operation (5b), the network uses the optimized beam list from operation (4) to select RSTD measurements reported by the UE in operation (3b).

In use case A3, the network selection relies on the UE SNR report of reference signals transmitted in the respective beams. The UE or a location-based service can request a positioning enhancement related to identification of an optimized and/or preferred list of beams. Based on the UE SNR measurements and the associated known beam directions, the network determines the optimum TRP/beam set for the specific UE. The network sends the optimized list to the UE to initiate the position determination and receives RSTD measurements from the UE corresponding to the optimized list. The network computes the UE position from these received measurements.

FIG. 10C is a flow diagram that depicts a procedure corresponding to the UE and network operations according to use case A3. Identically numbered operations to those in FIGS. 10A and/or 10B are functionally similar, so their descriptions will be omitted for brevity. In operation (0), positioning enhancement is requested to the network by the UE or a location-based service (e.g., external LCS client). Subsequently, operations (4)-(7) from FIG. 10A are performed by the UE or the network.

Figure 11:
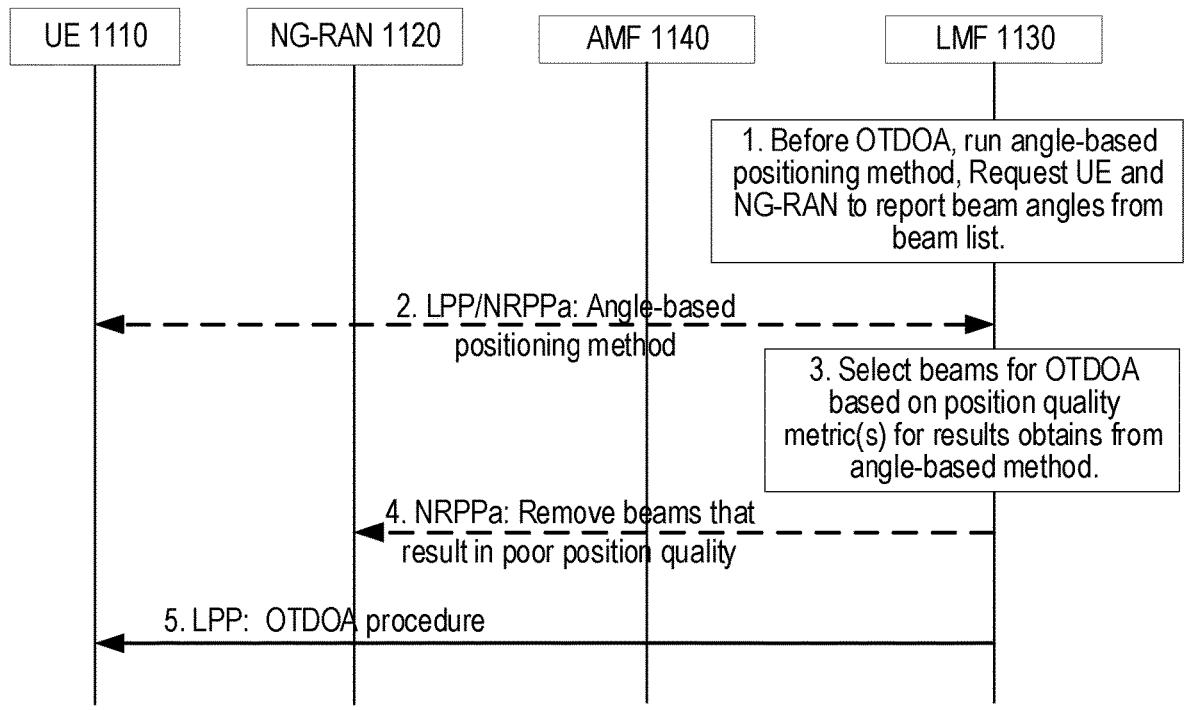
FIG. 11 shows a network signaling diagram illustrating various messages exchanged between UE, NG-RAN, and network functions in support of UE-assisted OTDOA positioning, according to various exemplary embodiments of the present disclosure.

In addition, FIG. 11 shows a network signaling diagram that illustrates various messages exchanged between UE 1110, NG-RAN 1120, AMF 1140, and LMF 1130 in support of UE-assisted OTDOA positioning according to various embodiments. Reference numbers will be omitted in the following high-level description for brevity.

In operation (1), before OTDOA positioning, the LMF initiates an angle-based positioning method during which the NG-RAN and the UE are requested to report beam angles of beams from a first list. The signaling flow for this angle-based method may include various messages that are illustrated in FIG. 11 as operation (2). In operation (3), the LMF selects beams for OTDOA positioning based on a position quality metric determined from the results obtained in operation (2). In operation (4), the LMF sends a request to NG-RAN to remove beams from the first list that were determined in operation (3) to provide poor position quality for the UE. In operation (5), the LMF initiates an OTDOA procedure with the UE based on the enhanced beam list.

In certain embodiments involving UE-based OTDOA positioning, the TRP/beam selection based on the position quality metric can be implemented either by the UE or by the network. Similar to UE-assisted embodiments, the selection can occur in relation to any of the following use cases:

B1: The network provides a generalized and/or complete list of TRPs/beams and UE determines an optimal subset of the list;

B2: UE receives by default an optimized list from the network; and

B3: UE requests the network to provide an optimized list to improve positioning performance.

In use case B1, the selection of TPs/beams relies on the assistance data provided by the network (e.g., in broadcast SIB or by unicast message). Such information includes TRP location along with directions of the beams containing PRS. Once the PRS signals are received and RSTDs are computed, the UE can select the best measurement set based on the position quality metric (e.g., based on a minimum of the metric).

Figure 12:
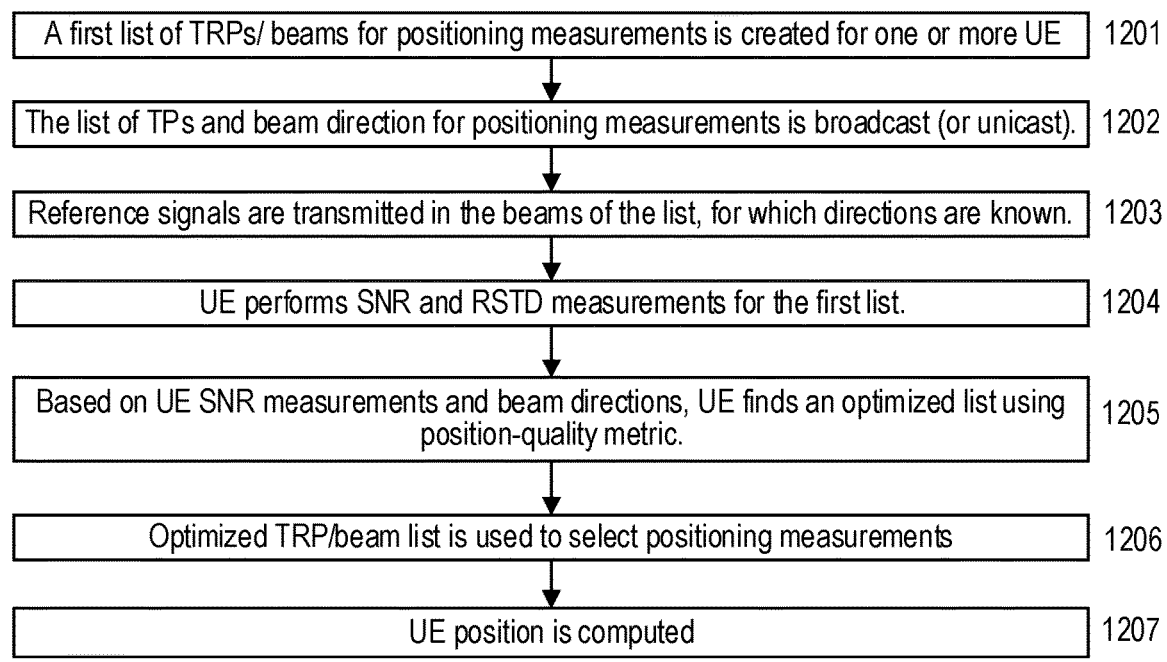
FIG. 12 shows a flow diagrams of a procedures for a UE-based OTDOA positioning use case, according to various exemplary embodiments of the present disclosure.

FIG. 12 is a flow diagram that depicts a procedure corresponding to the UE and network operations according to use case B1. In operation 1201, the network creates a first list of TRPs/beams for positioning measurements by one or more UEs. In operation 1202, the network transmits the first list by broadcast (e.g., as system information) or by unicast to particular ones of the UEs. In operation 1203, PRS are transmitted by the network in the first list of TRP/beams, for which the directions are known. In operation 1204, the UE performs SNR and RSTD measurements for the first list of beams. In operation 1205, based on the SNR measurements and known beam directions, the UE finds an optimized list based on a position-quality metric, such as disclosed elsewhere herein. In operation 1206, the UE uses the optimized list to select RSTD measurements, and computes its position based on these measurements in operation 1207.

For use cases B2 and B3, the TRP/beam selection is performed by the network, but the position determination is performed by the UE. The procedures for these use cases are similar to those for use cases A1 and A3, respectively, that are illustrated in FIGS. 10A and 10C. One difference is that UE position is computed by the UE (in operation 1207) rather than the network (illustrated by operation (7) in FIGS. 10A-C).

Figure 13:
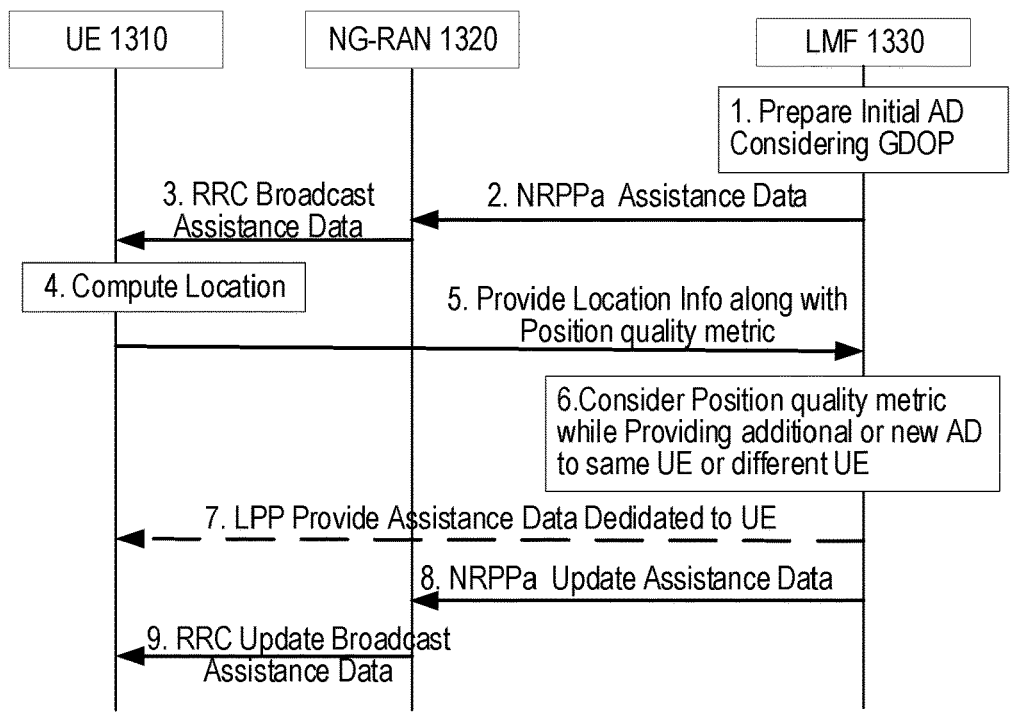
FIG. 13 shows a network signaling diagram illustrating various messages exchanged between UE, NG-RAN, and network functions in support of UE-based OTDOA positioning, according to various exemplary embodiments of the present disclosure.

In addition, FIG. 13 shows a network signaling diagram that illustrates various messages exchanged between UE 1310, NG-RAN 1320, and LMF 1330 in support of UE-based OTDOA positioning according to various embodiments. Reference numbers will be omitted in the following high-level description for brevity.

In operation (1), the LMF prepares an initial OTDOA assistance data (AD) based on GDOP considerations. In operation (2), the LMF sends the prepared assistance data to the NG-RAN, e.g., using the NRPPa protocol. In operation (3), the NG-RAN broadcasts the assistance data according to RRC protocol (e.g., as system information). In operation (4), the UE uses the assistance data to perform ODTOA measurements and compute its location. In operation (5), the UE sends the computed location to the LMF along with a position-quality metric related to the location. In operation (6), the LMF takes into account the position quality metric from the UE (optionally together with other position quality metrics from other UEs) when determining updated assistance data (AD) for the same UE and/or one or more different UEs. In operation (7), which is optional, the LMF provides the updated assistance data to the UE via LPP. In operation (8), the LMF sends the new assistance data to the NG-RAN, e.g., using the NRPPa protocol. In operation (9), the NG-RAN broadcasts the updated assistance data according to RRC protocol (e.g., as system information).

In various embodiments, the network can use a combination of broadcast, multicast, and unicast messages to provide positioning assistance data to UEs. In some embodiments, both the first list (e.g., non-optimized) and the second list (e.g., optimized) can be provided via broadcast, multicast, or unicast, with the second list being determined by the network based on positioning quality metric(s) calculated by the network.

In other embodiments, the second list may be complementary to (e.g., non-overlapping with) the first list. For example, the second list may comprise different type(s) of beams than the first list. In yet other embodiments, the second list may overlap with, or be a subset of, the first list.

In other embodiments, the first list can be provided via broadcast, multicast, or unicast and the second list can be determined by the UE (e.g., based on position quality metric(s)).

In certain UE-based embodiments, the various operations can be performed by two different UEs rather than by a UE and a network node. For example, a first UE (UE1) can perform operations 1201-1203 shown in FIG. 12, while a second UE (UE2) can perform operations 1204-1207 shown in FIG. 12. The first and second lists can be obtained via broadcast, multicast, or unicast. The second list can be determined by a UE (rather than a network node) when the UE is provided with full complement of assistance data including a complete cell list for a tracking area or Radio Network Area (RNA), and/or a complete network list.

As briefly mentioned above, the exemplary position quality metric used by various embodiments is related to a geometric dilution of precision (GDOP) metric. This metric is similar to GDOP for beams that experience LOS conditions, but differs for beams that experience non-line-of-sight (NLOS) conditions between the TP and the UE. As such, by comparing the GDOP feedback provided by the UE and the exemplary position quality metric, it is possible to determine if a NLOS situation is present in the positioning measurements. In other words, if one or more links is NLOS a mismatch between GDOP and the exemplary position quality metric will occur. As such, based on the UE measurements, the network (or UE) can assess the type of propagation scenario and trigger a new positioning session with better TPs/beams as needed.

Figure 14:
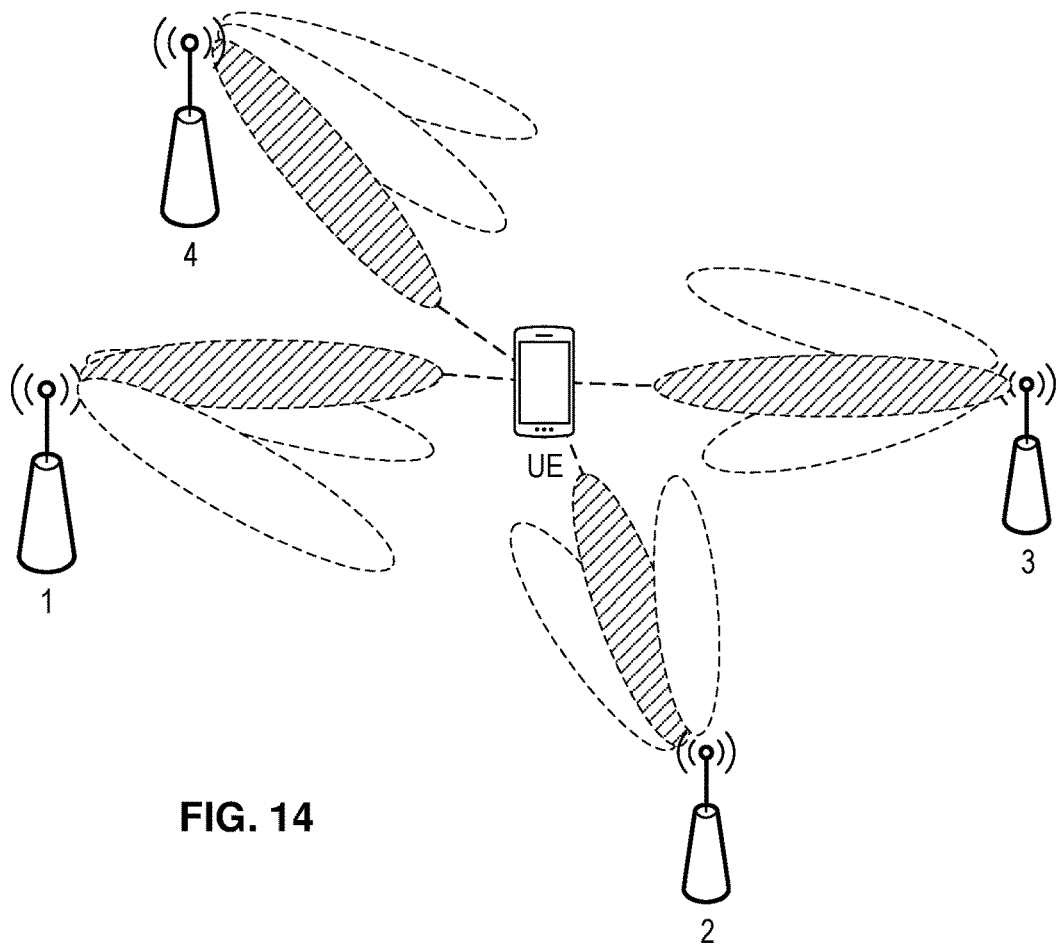
FIG. 14 shows an example of LOS channel conditions between a UE and beams from four transmission points (TPs).

FIG. 14 shows an example of LOS channel conditions between a UE and beams from four TPs, labelled 1-4. In this scenario, the trace of the inverse of the $J_k$ matrix (expressed in (2) above) is proportional to the GDOP. As such, the selected beams will be the same regardless of whether the selection is based on GDOP or the exemplary position quality metric.

Figure 15:
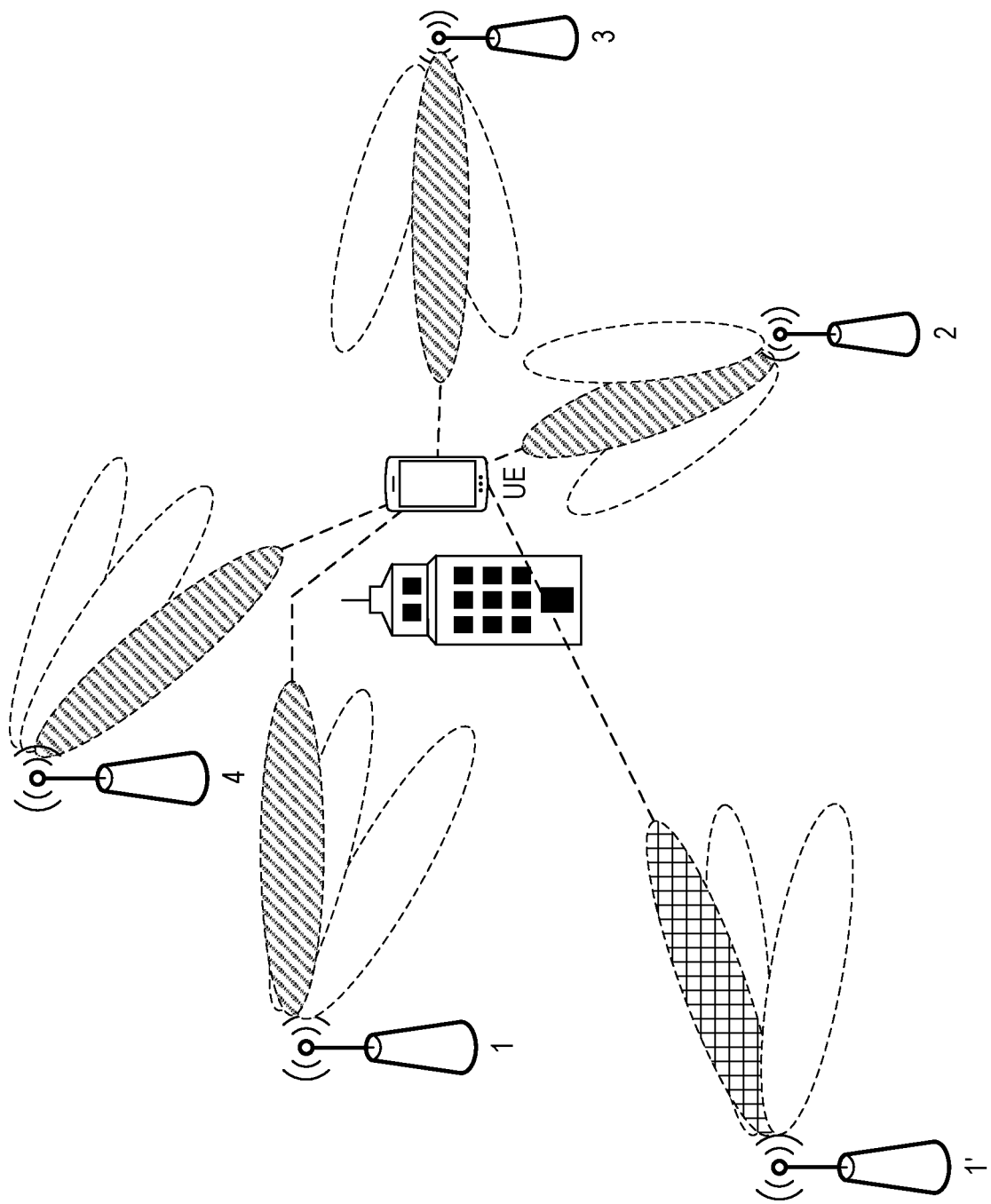
FIG. 15 shows an example NLOS channel conditions between a UE and a beam from one of the four TPs.

FIG. 15 shows another example of LOS channel conditions between a UE and beams from TPs 2-4, but where the LOS between TP1 and the UE is blocked, such that the UE receives the beam from TP1 via a reflected, NLOS path. In this situation, GDOP will differ from the exemplary position quality metric, and TP/beam selections will differ depending on which metric is used. For example, if the TRP/beam selection is based on GDOP (which considers only the geometry and the variance of the ranging measurement), it will yield the same TP/beam set as the LOS case.

In terms of position accuracy, however, better performance can be obtained by selecting a different set. Accordingly, the exemplary position quality metric will consider the impact of the NLOS link between TP1 and the UE. Put a different way, the exemplary position quality metric projects TP1 to a different location (labelled 1' in FIG. 15) and to a lower SNR than in LOS (illustrated in FIG. 15 by increased distance).

Various other embodiments can be utilized according to the principles of the present disclosure, discussed above. For example, the network's rate of update for broadcast assistance information can be based upon QoS requirements, such as location accuracy and latency, of the UEs in that cell. For some applications, the location accuracy QoS would be limited to whether the object has moved or not; other applications may have more stringent requirements related to actual position of the object. Furthermore, networks loading conditions often vary during busy and non-busy traffic hours, which can also affect the update rate. In addition, beam-based transmission is adaptive, such that narrow beams can be combined into wider beams and wide beams can be split into narrower beams. In such case, the network would need to update the assistance data according to the QoS requirements of the positioning application(s) supported by the UEs in the cell.

In other embodiments, the network can update the broadcast assistance information based on the exemplary position quality metric. For example, if reported/determined metrics indicate certain beams have become more or less reliable for position determination, the network can update the broadcast beam list accordingly.

In other embodiments, a first network node (e.g., location server) can provide suggestion to a second network node (e.g., base station/gNB) about which beam should be used for transmission of PRS. The second network node can then decide not to send PRSs on beam(s) that would not provide adequate position quality (e.g., according to the exemplary metric) for the UEs served by the second network node.

In other embodiments, the network can request position quality metric/GDOP feedback from UEs based on upon the UE capabilities of determining such position quality metrics. This capability can be advertised to the network by the respective UEs.

In some embodiments, the network can provide and update the broadcast of OTDOA assistance data (e.g., cell/beam list) such that majority of UEs can meet their QoS requirements using the broadcast information. For UEs that cannot meet their QoS requirements using the broadcast information, the network can provide a dedicated (e.g., unicast) signaling comprising a UE-specific cell/beam list. The network can determine such a list based on UE measurements (e.g., SNR) and/or the exemplary position quality metric.

In some embodiments, the network node can perform angle-based positioning of a UE prior to using OTDOA positioning. This can enable the network to understand the beam geometry involved and to prepare the TP/beam list accordingly to provide improved accuracy.

In some embodiments, the network can provide the updated (e.g., optimized) TP/beam list to a second UE located in proximity to a first UE that previously received the same updated TP/beam list.

In some embodiments, the network can classify the broadcast assistance information into categories based upon whether the UE is located at a front (e.g., near) part of the beam, at a middle part of the beam, or at an end (e.g., distant) part of the beam. In such case, the cell/beam list can be separated based upon where the UE is located in the beam. The UE can identify its location within the beam based upon signal strength thresholds. UEs can utilize a different TP/beam list based on its relative location within the beam. For example, a UE in the front uses TP/beam list intended for the UEs located in the front part of the beam. Such embodiments can be particularly suitable for wide beam or for large cells.

In some embodiments, a UE can select a cell for RSTD (TDOA) calculation based upon the cells that provides a better GDOP and/or positioning quality metric. The UE can compute angular information of different beams that transmit PRS. The UE can select the beams based upon a suitable position quality metric according to the angular information. Further, in an extended embodiment, the UE can consider its orientation obtained from the gyroscope inertial motion unit (IMU) sensor along with the angular information of the beam.

In some embodiments, a UE can provide GDOP and/or position quality metric feedback to the network (e.g., location server) via a positioning protocol such as LPP.

The embodiments described above can be further illustrated with reference to FIGS. 16-17, which depict exemplary methods (e.g., procedures) performed by a network node and a UE, respectively. Put differently, various features of the operations described below correspond to various embodiments described above.

Figure 16:
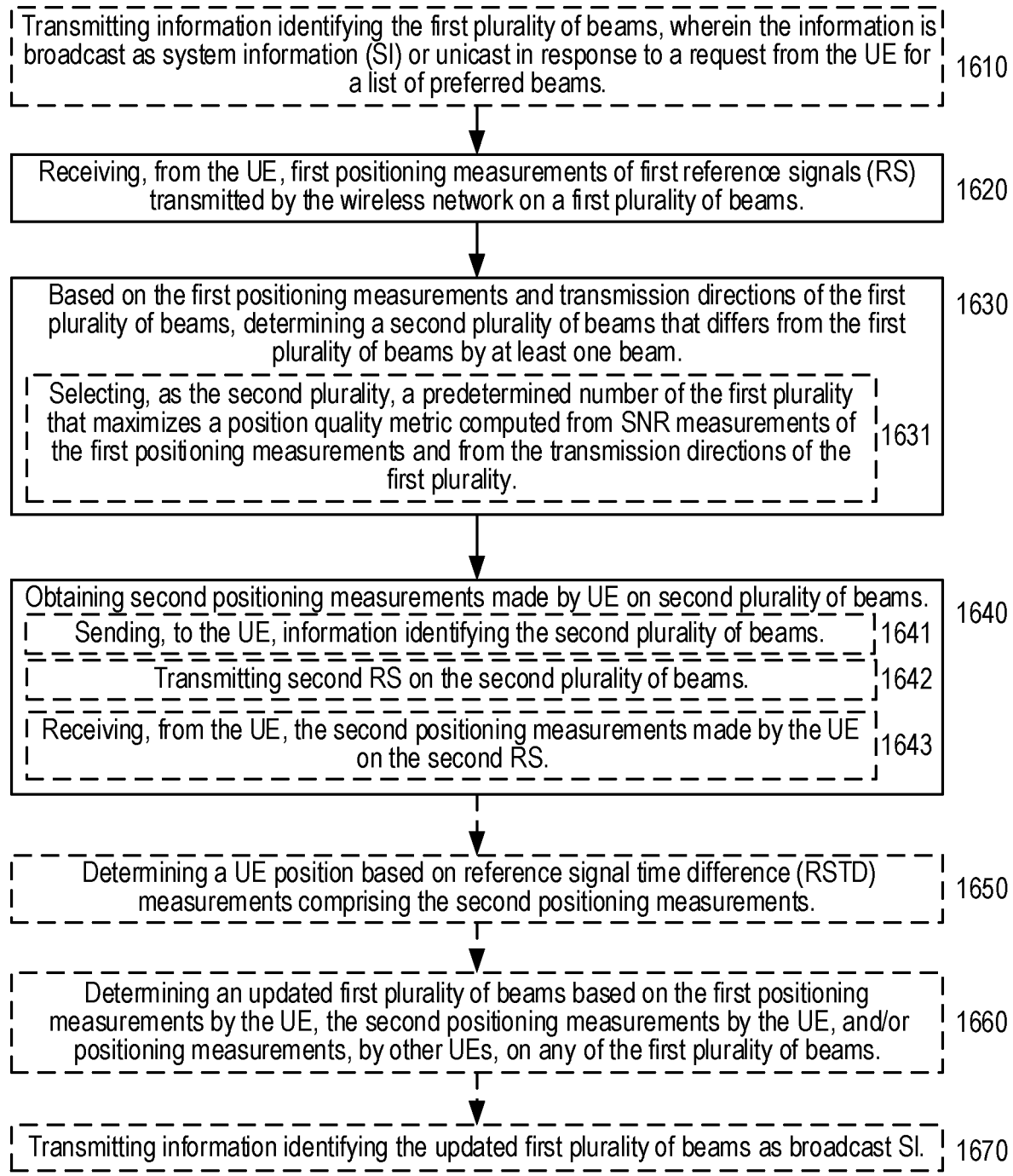
FIG. 16 is a flow diagram illustrating exemplary methods (e.g., procedures) for a network node (e.g., positioning server, E-SMLC, SMLC, LMF, eNB, gNB, etc. or component thereof), according to various exemplary embodiments of the present disclosure.

FIG. 16 is a flow diagram illustrating an exemplary method (e.g., procedure) for positioning a user equipment (UE) based on beams transmitted by a wireless network, according to various exemplary embodiments of the present disclosure. The exemplary method shown in FIG. 16 can be implemented in a network node (e.g., eNB, gNB, E-SMLC, LMF, etc.) shown in, or described in relation to, other figures herein. Furthermore, the exemplary method shown in FIG. 16 can be used cooperatively with other exemplary methods described herein (e.g., FIG. 17) to provide various exemplary benefits and/or advantages, including those described herein. Although FIG. 16 shows specific blocks in a particular order, the operations corresponding to the blocks can be performed in a different order than shown and can be combined and/or divided into blocks having different functionality than shown. Optional operations are indicated by dashed lines.

The exemplary method can include the operations of block 1620, in which the network node can receive, from the UE, first positioning measurements of first reference signals (RS) transmitted by the wireless network on a first plurality of beams. The first plurality of beams can include one or more beams originating from a transmission reception point (TRP) associated with the network node, and one or more beams originating from TRPs associated with other network nodes.

The exemplary method can also include the operations of block 1630, in which the network node can, based on the first positioning measurements and transmission directions of the first plurality of beams, determine a second plurality of beams that differs from the first plurality of beams by at least one beam (e.g., subset, superset, partially overlapping, etc.). The exemplary method can also include the operations of block 1640, in which the network node can obtain second positioning measurements made by the UE on the second plurality of beams.

In some embodiments, the exemplary method can also include the operations of block 1610, in which the network node can transmit information identifying the first plurality of beams. The information can be transmitted as broadcast system information (SI) or unicast to the UE in response to a request from the UE for a list of preferred beams. In some embodiments where the information identifying the first plurality of beams is transmitted as broadcast SI, the exemplary method can also include the operations of blocks 1660-1670. In block 1660, the network node can determine an updated first plurality of beams based on the first positioning measurements by the UE, the second positioning measurements by the UE, and/or positioning measurements by other UEs on any of the first plurality of beams. In block 1670, the network node can transmit information identifying the updated first plurality of beams as broadcast SI or unicast to the UE in response to a request, from the UE, for a list of preferred beams.

In some embodiments, the operations of block 1640 can include the operations of sub-blocks 1641-1643. In sub-block 1641, the network node can send, to the UE, information identifying the second plurality of beams. In sub-block 1642, the network node can transmit second RS on the second plurality of beams. In sub-block 1643, the network node can receive, from the UE, the second positioning measurements made by the UE on the second RS.

In some embodiments, the second RS are positioning reference signals (PRS) and the first RS are one of the following: PRS, synchronization signal/PBCH blocks (SSBs), or channel state information reference signals (CSI-RS). In some embodiments, the first positioning measurements comprise signal-to-noise ratio (SNR) measurements and the second positioning measurements comprise reference signal time difference (RSTD) measurements. In some embodiments, the exemplary method can also include the operations of block 1650, in which the network node can determine a UE position based on RSTD measurements comprising the second positioning measurements.

In some embodiments, the operations of block 1630 can include the operations of sub-block 1631, where the network node can select, as the second plurality, a predetermined number of the first plurality that maximizes a position quality metric computed from SNR measurements of the first positioning measurements and from the transmission directions of the first plurality. In some embodiments, determining the second plurality (e.g., in block 1630) can be based on a position quality metric that distinguishes between LOS and non-LOS propagation conditions associated with respective individual beams of the first plurality. An example of these embodiments is illustrated by equations (8)-(9) and the accompanying pseudocode, in which the position quality metric is derived from a Fisher matrix of an OTDOA system.

Figure 17:
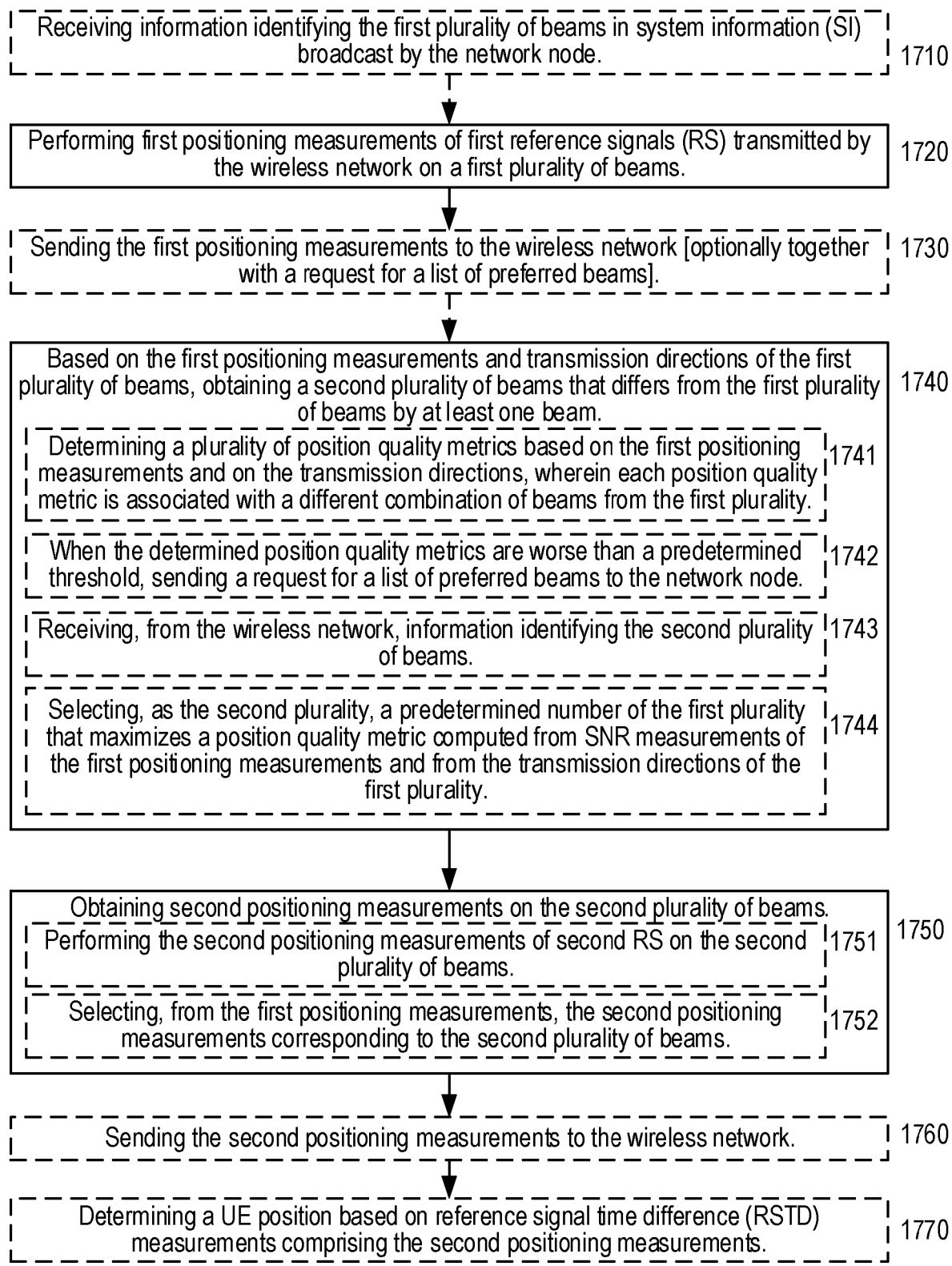
FIG. 17 is a flow diagram illustrating exemplary methods (e.g., procedures) for a user equipment (UE, e.g., wireless device, IoT device, etc. or component thereof), according to various exemplary embodiments of the present disclosure.

In addition, FIG. 17 is a flow diagram illustrating an exemplary method (e.g., procedure) for performing positioning measurements based on beams transmitted by a wireless network, according to various exemplary embodiments of the present disclosure. The exemplary method shown in FIG. 17 can be implemented by a user equipment (UE, e.g., wireless device, IoT device, etc. or component thereof) such as shown in, or described in relation to, other figures herein. Furthermore, the exemplary method shown in FIG. 17 can be used cooperatively with other exemplary methods described herein (e.g., FIG. 16) to provide various exemplary benefits and/or advantages, including those described herein. Although FIG. 17 shows specific blocks in a particular order, the operations corresponding to the blocks can be performed in a different order than shown and can be combined and/or divided into blocks having different functionality than shown. Optional operations are indicated by dashed lines.

The exemplary method can include the operations of block 1720, in which the UE can perform first positioning measurements on positioning reference signals (PRS) transmitted by the wireless network on a first plurality of beams. In some embodiments, the first plurality of beams can include one or more beams originating from a transmission reception point (TRP) associated with the network node, and one or more beams originating from TRPs associated with other network nodes.

The exemplary method can also include the operations of block 1740, in which the UE can, based on the first positioning measurements and transmission directions of the first plurality of beams, obtain a second plurality of beams that differs from the first plurality of beams by at least one beam (e.g., subset, superset, partially overlapping, etc.). The exemplary method can also include the operations of block 1750, in which the UE can obtain second positioning measurements on the second plurality of beams.

In some embodiments, the exemplary method can include the operations of block 1730, in which the UE can send the first positioning measurements to the wireless network. In such embodiments, obtaining the second plurality of beams in block 1740 can include the operations of sub-block 1743, where the UE can receive, from the wireless network, information identifying the second plurality of beams. In such embodiments, obtaining the second positioning measurements in block 1750 can include the operations of sub-block 1751, where the UE can perform the second positioning measurements of second RS on the second plurality of beams identified by the information from the wireless network (e.g., received in sub-block 1741).

In some of these embodiments, the second RS are positioning reference signals (PRS) and the first RS are one of the following: PRS, synchronization signal/PBCH blocks (SSBs), or channel state information reference signals (CSI-RS). In some of these embodiments, the first positioning measurements comprise signal-to-noise ratio (SNR) measurements and the second positioning measurements comprise reference signal time difference (RSTD) measurements.

In some of these embodiments, the exemplary method can include the operations of block 1710, in which the UE can receive information identifying the first plurality of beams in system information (SI) broadcast by the network node. In such embodiments, obtaining the second plurality in block 1740 can include the operations of sub-blocks 1741-1742. In sub-block 1741, the UE can determine a plurality of position quality metrics based on the first positioning measurements and on the transmission directions. Each position quality metric can be associated with a different combination of beams from the first plurality. In sub-block 1742, the network node can, when the determined position quality metrics are worse than a predetermined threshold, send a request for a list of preferred beams to the network node. In such embodiments, the information identifying the second plurality of beams is received from the network node (e.g., in sub-block 1743) via unicast signaling in response to the request.

In other embodiments, the first positioning measurements are sent to the wireless network (e.g., in block 1730) together with a request for a list of preferred beams. In such embodiments, the information identifying the second plurality of beams can be received (e.g., in sub-block 1743) in response to the request.

In other embodiments, obtaining the second positioning measurements in block 1750 can include the operations of sub-block 1752, where the UE can select, from the first positioning measurements, the second positioning measurements corresponding to the second plurality of beams. In such embodiments, the first positioning measurements can include signal-to-noise ratio (SNR) measurements and reference signal time difference (RSTD) measurements, e.g., such that the selected second positioning measurements also include RSTD measurements.

In some embodiments, the operations of block 1740 can include the operations of sub-block 1744, where the UE can select, as the second plurality, a predetermined number of the first plurality that maximizes a position quality metric computed from SNR measurements of the first positioning measurements and from the transmission directions of the first plurality. In some embodiments, obtaining the second plurality (e.g., in block 1740) can be based on a position quality metric that distinguishes between LOS and non-LOS propagation conditions associated with respective individual beams of the first plurality. An example of these embodiments is illustrated by equations (8)-(9) and the accompanying pseudocode, in which the position quality metric is derived from a Fisher matrix of an OTDOA system.

In some embodiments, the exemplary method can also include the operations of block 1760, where the UE can send the second positioning measurements to the wireless network (e.g., for UE-assisted positioning); or block 1770, where the UE can determine a UE position based on reference signal time difference (RSTD) measurements comprising the second positioning measurements (e.g., for UE-based positioning).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 18:
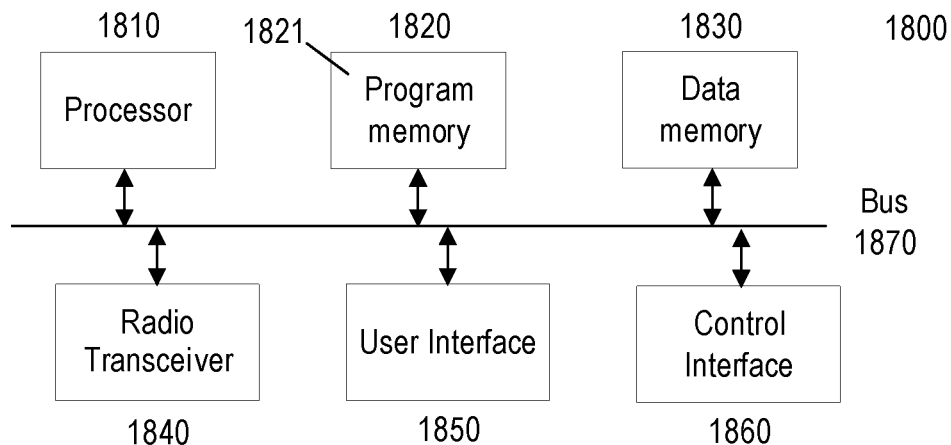
FIG. 18 is a block diagram of an exemplary wireless device or user equipment, according to various exemplary embodiments of the present disclosure.

FIG. 18 shows a block diagram of an exemplary wireless device or user equipment (UE) 1800 (hereinafter referred to as "UE 1800") according to various embodiments of the present disclosure, including those described above with reference to other figures. For example, UE 1800 can be configured by execution of instructions, stored on a computer-readable medium, to perform operations corresponding to one or more of the exemplary methods described herein.

UE 1800 can include a processor 1810 (also referred to as "processing circuitry") that can be operably connected to a program memory 1820 and/or a data memory 1830 via a bus 1870 that can comprise parallel address and data buses, serial ports, or other methods and/or structures known to those of ordinary skill in the art. Program memory 1820 can store software code, programs, and/or instructions (collectively shown as computer program product 1821 in FIG. 18) that, when executed by processor 1810, can configure and/or facilitate UE 1800 to perform various operations, including operations corresponding to various exemplary methods described herein. As part of or in addition to such operations, execution of such instructions can configure and/or facilitate UE 1800 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1840, user interface 1850, and/or control interface 1860.

As another example, processor 1810 can execute program code stored in program memory 1820 that corresponds to MAC, RLC, PDCP, and RRC layer protocols standardized by 3GPP (e.g., for NR and/or LTE). As a further example, processor 1810 can execute program code stored in program memory 1820 that, together with radio transceiver 1840, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1810 can execute program code stored in program memory 1820 that, together with radio transceiver 1840, implements device-to-device (D2D) communications with other compatible devices and/or UEs.

Program memory 1820 can also include software code executed by processor 1810 to control the functions of UE 1800, including configuring and controlling various components such as radio transceiver 1840, user interface 1850, and/or control interface 1860. Program memory 1820 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1820 can comprise an external storage arrangement (not shown) remote from UE 1800, from which the instructions can be downloaded into program memory 1820 located within or removably coupled to UE 1800, so as to enable execution of such instructions.

Data memory 1830 can include memory area for processor 1810 to store variables used in protocols, configuration, control, and other functions of UE 1800, including operations corresponding to, or comprising, any of the exemplary methods described herein. Moreover, program memory 1820 and/or data memory 1830 can include non-volatile memory (e.g., flash memory), volatile memory (e.g., static or dynamic RAM), or a combination thereof. Furthermore, data memory 1830 can comprise a memory slot by which removable memory cards in one or more formats (e.g., SD Card, Memory Stick, Compact Flash, etc.) can be inserted and removed.

Persons of ordinary skill will recognize that processor 1810 can include multiple individual processors (including, e.g., multi-core processors), each of which implements a portion of the functionality described above. In such cases, multiple individual processors can be commonly connected to program memory 1820 and data memory 1830 or individually connected to multiple individual program memories and or data memories. More generally, persons of ordinary skill in the art will recognize that various protocols and other functions of UE 1800 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1840 can include radio-frequency transmitter and/or receiver functionality that facilitates the UE 1800 to communicate with other equipment supporting like wireless communication standards and/or protocols. In some exemplary embodiments, the radio transceiver 1840 includes one or more transmitters and one or more receivers that enable UE 1800 to communicate according to various protocols and/or methods proposed for standardization by 3GPP and/or other standards bodies. For example, such functionality can operate cooperatively with processor 1810 to implement a PHY layer based on OFDM, OFDMA, and/or SC-FDMA technologies, such as described herein with respect to other figures.

In some exemplary embodiments, radio transceiver 1840 includes one or more transmitters and one or more receivers that can facilitate the UE 1800 to communicate with various LTE, LTE-Advanced (LTE-A), and/or NR networks according to standards promulgated by 3GPP. In some exemplary embodiments of the present disclosure, the radio transceiver 1840 includes circuitry, firmware, etc. necessary for the UE 1800 to communicate with various NR, NR-U, LTE, LTE-A, LTE-LAA, UMTS, and/or GSM/EDGE networks, also according to 3GPP standards. In some embodiments, radio transceiver 1840 can include circuitry supporting D2D communications between UE 1800 and other compatible devices.

In some embodiments, radio transceiver 1840 includes circuitry, firmware, etc. necessary for the UE 1800 to communicate with various CDMA2000 networks, according to 3GPP2 standards. In some embodiments, the radio transceiver 1840 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1840 can include a transceiver that is capable of wired communication, such as by using IEEE 802.3 Ethernet technology. The functionality particular to each of these embodiments can be coupled with and/or controlled by other circuitry in the UE 1800, such as the processor 1810 executing program code stored in program memory 1820 in conjunction with, and/or supported by, data memory 1830.

User interface 1850 can take various forms depending on the particular embodiment of UE 1800, or can be absent from UE 1800 entirely. In some embodiments, user interface 1850 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1800 can comprise a tablet computing device including a larger touchscreen display. In such embodiments, one or more of the mechanical features of the user interface 1850 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1800 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1800 having a touch screen display are capable of receiving user inputs, such as inputs related to exemplary methods described herein or otherwise known to persons of ordinary skill.

In some embodiments, UE 1800 can include an orientation sensor, which can be used in various ways by features and functions of UE 1800. For example, the UE 1800 can use outputs of the orientation sensor to determine when a user has changed the physical orientation of the UE 1800's touch screen display. An indication signal from the orientation sensor can be available to any application program executing on the UE 1800, such that an application program can change the orientation of a screen display (e.g., from portrait to landscape) automatically when the indication signal indicates an approximate 180-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1860 of the UE 1800 can take various forms depending on the particular exemplary embodiment of UE 1800 and of the particular interface requirements of other devices that the UE 1800 is intended to communicate with and/or control. For example, the control interface 1860 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1860 can comprise an IEEE 802.3 Ethernet interface such as described above. In some exemplary embodiments of the present disclosure, the control interface 1860 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1800 can comprise more functionality than is shown in FIG. 18 including, for example, a video and/or still-image camera, microphone, media player and/or recorder, etc. Moreover, radio transceiver 1840 can include circuitry necessary to communicate using additional radio-frequency communication standards including Bluetooth, GPS, and/or others.

Moreover, the processor 1810 can execute software code stored in the program memory 1820 to control such additional functionality. For example, directional velocity and/or position estimates output from a GPS receiver can be available to any application program executing on the UE 1800, including any program code corresponding to and/or embodying any exemplary embodiments (e.g., of methods) described herein.

Figure 19:
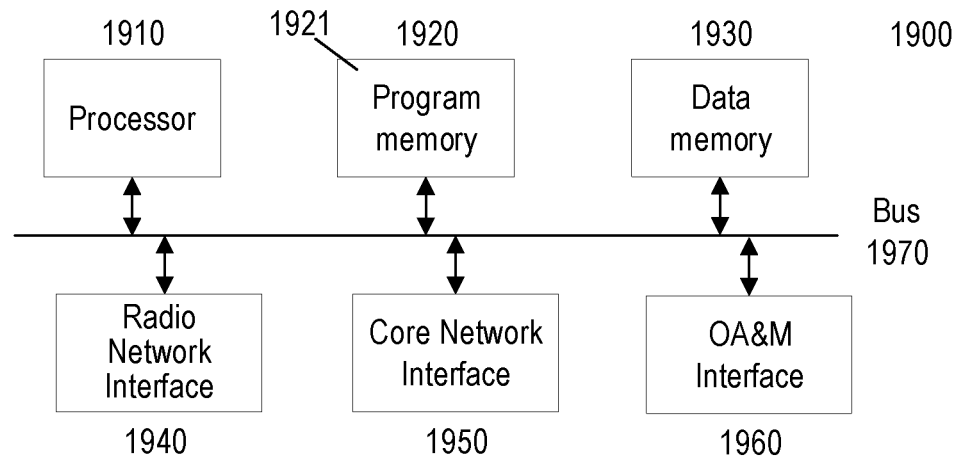
FIG. 19 is a block diagram of an exemplary network node (e.g., a base station, eNB, gNB, etc.), according to various exemplary embodiments of the present disclosure.

FIG. 19 shows a block diagram of an exemplary network node 1900 according to various embodiments of the present disclosure, including those described above with reference to other figures. For example, exemplary network node 1900 can be configured by execution of instructions, stored on a computer-readable medium, to perform operations corresponding to one or more of the exemplary methods described herein. In some exemplary embodiments, network node 1900 can comprise a base station, eNB, gNB, or one or more components thereof. For example, network node 1900 can be configured as a central unit (CU) and one or more distributed units (DUs) according to NR gNB architectures specified by 3GPP. More generally, the functionally of network node 1900 can be distributed across various physical devices and/or functional units, modules, etc.

Network node 1900 can include processor 1910 (also referred to as "processing circuitry") that is operably connected to program memory 1920 and data memory 1930 via bus 1970, which can include parallel address and data buses, serial ports, or other methods and/or structures known to those of ordinary skill in the art.

Program memory 1920 can store software code, programs, and/or instructions (collectively shown as computer program product 1921 in FIG. 19) that, when executed by processor 1910, can configure and/or facilitate network node 1900 to perform various operations, including operations corresponding to various exemplary methods described herein. As part of and/or in addition to such operations, program memory 1920 can also include software code executed by processor 1910 that can configure and/or facilitate network node 1900 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1940 and/or core network interface 1950. By way of example, core network interface 1950 can comprise the S1 or NG interface and radio network interface 1940 can comprise the Uu interface, as standardized by 3GPP. Program memory 1920 can also comprise software code executed by processor 1910 to control the functions of network node 1900, including configuring and controlling various components such as radio network interface 1940 and core network interface 1950.

Data memory 1930 can comprise memory area for processor 1910 to store variables used in protocols, configuration, control, and other functions of network node 1900. As such, program memory 1920 and data memory 1930 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1910 can include multiple individual processors (not shown), each of which implements a portion of the functionality described above. In such case, multiple individual processors may be commonly connected to program memory 1920 and data memory 1930 or individually connected to multiple individual program memories and/or data memories. More generally, persons of ordinary skill will recognize that various protocols and other functions of network node 1900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1940 can comprise transmitters, receivers, signal processors, ASICs, antennas, beamforming units, and other circuitry that enables network node 1900 to communicate with other equipment such as, in some embodiments, a plurality of compatible user equipment (UE). In some embodiments, interface 1940 can also enable network node 1900 to communicate with compatible satellites of a satellite communication network. In some exemplary embodiments, radio network interface 1940 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1940. According to further exemplary embodiments of the present disclosure, the radio network interface 1940 can comprise a PHY layer based on OFDM, OFDMA, and/or SC-FDMA technologies. In some embodiments, the functionality of such a PHY layer can be provided cooperatively by radio network interface 1940 and processor 1910 (including program code in memory 1920).

Core network interface 1950 can comprise transmitters, receivers, and other circuitry that enables network node 1900 to communicate with other equipment in a core network such as, in some embodiments, circuit-switched (CS) and/or packet-switched Core (PS) networks. In some embodiments, core network interface 1950 can comprise the S1 interface standardized by 3GPP. In some embodiments, core network interface 1950 can comprise the NG interface standardized by 3GPP. In some exemplary embodiments, core network interface 1950 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1950 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1900 can include hardware and/or software that configures and/or facilitates network node 1900 to communicate with other network nodes in a RAN, such as with other eNBs, gNBs, ng-eNBs, en-gNBs, IAB nodes, etc. Such hardware and/or software can be part of radio network interface 1940 and/or core network interface 1950, or it can be a separate functional unit (not shown). For example, such hardware and/or software can configure and/or facilitate network node 1900 to communicate with other RAN nodes via the X2 or Xn interfaces, as standardized by 3GPP.

OA&M interface 1960 can comprise transmitters, receivers, and other circuitry that enables network node 1900 to communicate with external networks, computers, databases, and the like for purposes of operations, administration, and maintenance of network node 1900 or other network equipment operably connected thereto. Lower layers of OA&M interface 1960 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1940, core network interface 1950, and OA&M interface 1960 may be multiplexed together on a single physical interface, such as the examples listed above.

Figure 20:
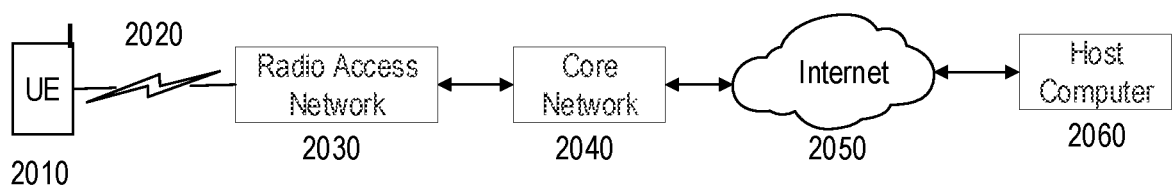
FIG. 20 is a block diagram of an exemplary network configuration usable to provide over-the-top (OTT) data services between a host computer and a user equipment, according to various exemplary embodiments of the present disclosure.

FIG. 20 is a block diagram of an exemplary communication network configured to provide over-the-top (OTT) data services between a host computer and a user equipment (UE), according to one or more exemplary embodiments of the present disclosure. UE 2010 can communicate with radio access network (RAN) 2030 over radio interface 2020, which can be based on protocols described above including, e.g., LTE, LTE-A, and 5G/NR. For example, UE 2010 can be configured and/or arranged as shown in other figures discussed above.

RAN 2030 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2030 can cooperatively operate using licensed and unlicensed spectrum. In some embodiments, RAN 2030 can include, or be capable of communication with, one or more satellites comprising a satellite access network.

RAN 2030 can further communicate with core network 2040 according to various protocols and interfaces described above. For example, one or more apparatus (e.g., base stations, eNBs, gNBs, etc.) comprising RAN 2030 can communicate to core network 2040 via a core network interface such as those described above in relation to other figures. In some exemplary embodiments, RAN 2030 and core network 2040 can be configured and/or arranged as shown in other figures discussed above. For example, eNBs comprising an E-UTRAN 2030 can communicate with an EPC core network 2040 via an S1 interface. As another example, gNBs and ng-eNBs comprising an NG-RAN 2030 can communicate with a 5GC core network 2030 via an NG interface.

Core network 2040 can further communicate with an external packet data network, illustrated in FIG. 20 as Internet 2050, according to various protocols and interfaces known to persons of ordinary skill in the art. Many other devices and/or networks can also connect to and communicate via Internet 2050, such as exemplary host computer 2060. In some exemplary embodiments, host computer 2060 can communicate with UE 2010 using Internet 2050, core network 2040, and RAN 2030 as intermediaries. Host computer 2060 can be a server (e.g., an application server) under ownership and/or control of a service provider. Host computer 2060 can be operated by the OTT service provider or by another entity on the service provider's behalf.

For example, host computer 2060 can provide an over-the-top (OTT) packet data service to UE 2010 using facilities of core network 2040 and RAN 2030, which can be unaware of the routing of an outgoing/incoming communication to/from host computer 2060. Similarly, host computer 2060 can be unaware of routing of a transmission from the host computer to the UE, e.g., the routing of the transmission through RAN 2030. Various OTT services can be provided using the exemplary configuration shown in FIG. 20 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 20 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments that facilitate a UE determining beams transmitting PRS and other communication-related (e.g., RRM) signals and data, without ambiguity, can play a critical role by enabling UE 2010 and RAN 2030 to meet the requirements of the particular OTT service between host computer 2060 and UE 2010. For example, such techniques allow the UE to more quickly and accurately determine its position (or facilitate the network to determine the UE's position) in accordance with particular QoS requirements of applications associated with the UE. Timely and accurate determination of UE position can facilitate and/or improve various OTT data services that are supported by the network and/or the UE. In this manner, exemplary embodiments can improve data throughput in a coverage area and enable a greater number of users to utilize data-intensive services such as streaming video in various coverage conditions without excessive power consumption or other degradations to user experience, such as dropped data connections caused by delayed handover due to measurement delays.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some to implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A method, performed by a network node in a wireless network, for positioning a user equipment (UE) based on beams transmitted by the wireless network, the method comprising:
transmitting positioning reference signals (PRS) on a plurality of beams comprising a first list;
obtaining, from the UE, at least first positioning measurements for the beams comprising the first list;
based on the first positioning measurements and known locations from which the beams comprising the first list were transmitted, determining a second list of beams; and
obtaining second positioning measurements for the beams comprising the second list.

E2. The method of embodiment E1, wherein the second list of beams is determined using a position quality metric that distinguishes between line-of-sight (LOS) and non-LOS propagation conditions.

E3. The method of any of embodiments E1-E2, wherein:
the first positioning measurements comprise signal-to-noise ratio (SNR) measurements; and
the second positioning measurements comprise reference signal time difference (RSTD) measurements.

E4. The method of any of embodiments E1-E3, further comprising:
determining a first list of beams on which at least first positioning measurements should be performed; and
transmitting the first list of beams to one or more UEs, including the UE.

E5. The method of any of embodiments E1-E4, wherein obtaining second positioning measurements for the beams comprising the second list comprises:
obtaining, from the UE, the second positioning measurements for the beams comprising the first list; and
selecting the second positioning measurements for the beams comprising the second list from the obtained second positioning measurements for the beams comprising the first list.

E6. The method of any of embodiments E1-E4, wherein obtaining second positioning measurements for the beams comprising the second list comprises:
sending the second list of beams to the UE; and
receiving, from the UE, the second positioning measurements for the beams comprising the second list.

E7. The method of embodiment E6, wherein the second list of beams is sent to the UE in response to a request received from the UE.

E8. The method of any of embodiments E1-E7, further comprising obtaining a UE position based on the second positioning measurements for the beams comprising the second list.

E9. The method of embodiment E8, wherein obtaining the UE position comprises one of the following:
computing the UE position based on second positioning measurements received from the UE; or
receiving the UE position from the UE.

E10. The method of any of embodiments E1-E9, wherein the second list is a subset of the first list.

E11. A method, performed by a user equipment (UE), for performing positioning measurements based on beams transmitted by a wireless network, the method comprising:
performing at least first positioning measurements on positioning reference signals (PRS) carried by a plurality of beams comprising a first list;
obtaining a second list of beams based on the first positioning measurements; and
obtaining second positioning measurements on PRS carried by the beams comprising the second list.

E12. The method of embodiment E11, wherein:
the first positioning measurements comprise signal-to-noise ratio (SNR) measurements; and
the second positioning measurements comprise reference signal time difference (RSTD) measurements.

E13. The method of any of embodiments E1 1-E12, further comprising receiving the first list of beams from the network.

E14. The method of embodiment E13, wherein the first list of beams is received in response to a request from the UE.

E15. The method of any of embodiments E11-E14, wherein obtaining the second list of beams comprises:
sending, to the network, the first positioning measurements for the beams comprising the first list; and
in response, receiving the second list of beams from the network.

E16. The method of any of embodiments E11-E14, wherein obtaining the second list of beams comprises determining the second list based on the first positioning measurements and known locations from which the beams comprising the first list were transmitted.

E17. The method of embodiment E16, wherein the second list of beams is determined using a position quality metric that distinguishes between line-of-sight (LOS) and non-LOS propagation conditions.

E18. The method of any of embodiments E11-E17, wherein the second list is a subset of the first list.

E19. The method of any of embodiments E11-E18, wherein obtaining the second positioning measurements comprises:
performing second positioning measurements on PRS carried by the beams comprising the first list; and
selecting the second positioning measurements for the beams comprising the second list from the second positioning measurements for the beams comprising the first list.

E20. The method of any of embodiments E11-E19, further comprising computing the UE position based on the obtained second positioning measurements.

E21. A network node configured for positioning one or more user equipment (UE) based on beams transmitted by the wireless network, the network node comprising:
network interface circuitry configured to communicate with the one or more user equipment (UE); and
processing circuitry operably coupled to the network interface circuitry, whereby the network interface circuitry and the processing circuitry are configured to perform operations corresponding to the methods of any of embodiments E1-E10.

E22. A network node configured for positioning one or more user equipment (UE) based on beams transmitted by the wireless network, the network node being arranged to perform operations corresponding to the methods of any of embodiments E1-E10.

E23. A non-transitory, computer-readable medium storing computer-executable instructions that, when executed by at least one processor of a network node configured for operation in a wireless network, configure the network node to perform operations corresponding to the methods of any of embodiments E1-E10.

E24. A computer program product comprising computer-executable instructions that, when executed by at least one processor of a network node configured for operation in a wireless network, configure the network node to perform operations corresponding to the methods of any of embodiments E1-E10.

E25. A User Equipment (UE) configured to perform positioning measurements based on beams transmitted by a wireless network, the UE comprising:
a radio transceiver configured to receive a plurality of beams transmitted by the wireless network; and
processing circuitry operably coupled to the radio transceiver, whereby the radio transceiver and processing circuitry are configured to perform operations corresponding to the methods of any of embodiments E11-E20.

E26. A user equipment (UE) configured to perform positioning measurements based on beams transmitted by a wireless network, the UE being arranged to perform operations corresponding to the methods of any of embodiments E11-E20.

E27. A non-transitory, computer-readable medium storing computer-executable instructions that, when executed by at least one processor of a user equipment (UE), configure the UE to perform operations corresponding to the methods of any of embodiments E11-E20.

E28. A computer program product comprising computer-executable instructions that, when executed by at least one processor of a user equipment (UE), configure the UE to perform operations corresponding to the methods of any of embodiments E11-E20.

The invention claimed is:

1. A method, performed by a network node in a wireless network, for positioning a user equipment (UE), based on beams transmitted by the wireless network, the method comprising:
receiving, from the UE, first positioning measurements of first reference signals (RS) transmitted by the wireless network on a first plurality of beams;
based on the first positioning measurements and transmission directions of the first plurality of beams, determining a second plurality of beams that differs from the first plurality of beams by at least one beam; and
obtaining second positioning measurements made by the UE on the second plurality of beams, wherein obtaining the second positioning measurements comprises:
sending, to the UE, information identifying the second plurality of beams;
transmitting second RS on the second plurality of beams; and
receiving, from the UE, the second positioning measurements made by the UE on the second RS.

2. The method of claim 1, wherein:
the second RS are positioning reference signals (PRS); and
the first RS are one of the following: PRS, synchronization signal/PBCH blocks (SSBs), or channel state information reference signals (CSI-RS).

3. The method of claim 1, wherein:
the first positioning measurements comprise signal-to-noise ratio (SNR) measurements; and
the second positioning measurements comprise reference signal time difference (RSTD) measurements.

4. The method of claim 1, wherein determining the second plurality of beams comprises selecting, as the second plurality, a predetermined number of the first plurality that maximizes a position quality metric computed from SNR measurements of the first positioning measurements and from the transmission directions of the first plurality.

5. The method of claim 1, wherein determining the second plurality of beams is based on a position quality metric that distinguishes between line-of-sight (LOS) and non-LOS propagation conditions associated with respective individual beams of the first plurality.

6. The method of claim 1, further comprising transmitting information identifying the first plurality of beams, wherein the information is transmitted as one of the following:
unicast to the UE in response to a request, from the UE, for a list of preferred beams; or
broadcast system information (SI).

7. The method of claim 6, wherein:
the information identifying the first plurality of beams is transmitted as broadcast SI; and
the method further comprises:
determining an updated first plurality of beams based on at least one of the following:
the first positioning measurements by the UE,
the second positioning measurements by the UE, and
positioning measurements, by other UEs, on any of the first plurality of beams; and
transmitting information identifying the updated first plurality of beams as one of the following:
unicast to the UE in response to a request, from the UE, for a list of preferred beams; or
broadcast system information (SI).

8. The method of claim 1, further comprising determining a UE position based on reference signal time difference (RSTD) measurements comprising the second positioning measurements.

9. The method of claim 1, wherein the first plurality of beams include:
one or more beams originating from a transmission reception point, TRP, associated with the network node, and
one or more beams originating from TRPs associated with other network nodes.

10. A method, performed by a user equipment (UE), for positioning measurements based on beams transmitted by a wireless network, the method comprising:
performing first positioning measurements of first reference signals (RS) transmitted by the wireless network on a first plurality of beams;
sending the first positioning measurements to the wireless network;
based on the first positioning measurements and transmission directions of the first plurality of beams, obtaining a second plurality of beams that differs from the first plurality of beams by at least one beam, wherein obtaining the second plurality of beams comprises receiving, from the wireless network, information identifying the second plurality of beams; and
obtaining second positioning measurements on the second plurality of beams, wherein obtaining the second positioning measurements comprises performing the second positioning measurements of second RS on the second plurality of beams identified by the information from the wireless network.

11. The method of claim 10, wherein:
the second RS are positioning reference signals, PRS; and
the first RS are one of the following: PRS; synchronization signal/PBCH blocks (SSBs); or channel state information reference signals (CSI-RS).

12. The method of claim 10:
the first positioning measurements comprise signal-to-noise ratio (SNR) measurements; and
the second positioning measurements comprise reference signal time difference (RSTD) measurements.

13. The method of claim 10, wherein:
the method further comprises receiving information identifying the first plurality of beams in system information, SI, broadcast by the network node; and
obtaining the second plurality of beams further comprises:
determining a plurality of position quality metrics based on the first positioning measurements and on the transmission directions, wherein each position quality metric is associated with a different combination of beams from the first plurality; and
when the determined position quality metrics are worse than a predetermined threshold, sending a request for a list of preferred beams to the network node,
wherein the information identifying the second plurality of beams is received from the network node via unicast signaling in response to the request.

14. The method of claim 10, wherein performing the second positioning measurements comprises selecting, from the first positioning measurements, the second positioning measurements corresponding to the second plurality of beams.

15. The method of claim 14, wherein the first positioning measurements comprise signal-to-noise ratio (SNR) measurements and reference signal time difference (RSTD) measurements.

16. The method of claim 14, wherein the second plurality of beams comprises a predetermined number of the first plurality that maximizes a position quality metric computed from SNR measurements of the first positioning measurements and from the transmission directions of the first plurality.

17. The method of claim 14, wherein the second plurality of beams is based on a position quality metric that distinguishes between line-of-sight (LOS) and non-LOS propagation conditions associated with respective individual beams of the first plurality.

18. The method of claim 10, wherein:
the first positioning measurements are sent to the wireless network together with a request for a list of preferred beams; and
the information identifying the second plurality of beams is received in response to the request.

19. The method of claim 10, further comprising one of the following:
sending the second positioning measurements to the wireless network; or
determining a UE position based on reference signal time difference (RSTD) measurements comprising the second positioning measurements.

20. A network node configured for positioning one or more user equipment (UEs) based on beams transmitted by a wireless network, the network node comprising:
communication interface circuitry configured to communicate with the one or more UEs; and
processing circuitry operably coupled to the communication interface circuitry, whereby the processing circuitry and the communication interface circuitry are configured to perform operations corresponding to the method of claim 1.

21. A non-transitory, computer-readable medium storing computer-executable instructions that, when executed by processing circuitry of a network node, configure the network node to perform operations corresponding to the method of claim 1.

22. A user equipment (UE) configured to perform positioning measurements based on beams transmitted by a wireless network, the UE comprising:
radio transceiver circuitry configured to communicate with the wireless network, including to receive a plurality of beams transmitted by the wireless network; and
processing circuitry operably coupled to the radio transceiver circuitry, whereby the processing circuitry and the radio transceiver circuitry are configured to perform operations corresponding to the method of claim 10.

23. A non-transitory, computer-readable medium storing computer-executable instructions that, when executed by processing circuitry of a user equipment (UE) configured to perform positioning measurements based on beams transmitted by a wireless network, configure the UE to perform operations corresponding to the method of claim 10.

* * * * *